(12) United States Patent
Takayama et al.

(10) Patent No.: US 11,473,789 B2
(45) Date of Patent: Oct. 18, 2022

(54) OUTDOOR UNIT FOR A REFRIGERATION CYCLE APPARATUS AND REFRIGERATING CYCLE DEVICE

(71) Applicant: Mitsubishi Electric Corporation, Tokyo (JP)

(72) Inventors: Yuji Takayama, Tokyo (JP); Kazunori Hatakeyama, Tokyo (JP); Yuichi Shimizu, Tokyo (JP); Keisuke Uemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/056,058

(22) PCT Filed: May 31, 2018

(86) PCT No.: PCT/JP2018/020884
§ 371 (c)(1),
(2) Date: Nov. 17, 2020

(87) PCT Pub. No.: WO2019/229914
PCT Pub. Date: Dec. 5, 2019

(65) Prior Publication Data
US 2021/0254841 A1    Aug. 19, 2021

(51) Int. Cl.
*F24F 1/24*    (2011.01)
*F25B 1/00*    (2006.01)
(Continued)

(52) U.S. Cl.
CPC ............... *F24F 1/24* (2013.01); *F24F 1/22* (2013.01); *F25B 1/00* (2013.01); *F25B 49/025* (2013.01);
(Continued)

(58) Field of Classification Search
CPC ................................. F24F 1/24; F25B 49/025
See application file for complete search history.

(56) References Cited

U.S. PATENT DOCUMENTS 5,515,002 A * 5/1996 Ideler .................. G01R 33/3852
330/146
6,456,182 B1 * 9/2002 Katayama ............. H01F 17/062
336/170

(Continued)

FOREIGN PATENT DOCUMENTS

CN    101392933 A    3/2009
CN    102055308 A    5/2011

(Continued)

OTHER PUBLICATIONS

Office Action dated Jul. 20, 2021, issued in corresponding JP Patent Application No. 2020-522488 (and English machine translation).

(Continued)

*Primary Examiner* — Jonathan Bradford
(74) *Attorney, Agent, or Firm* — Posz Law Group, PLC

(57) ABSTRACT

An outdoor unit includes at least one heat exchanger, a first motor including a first fan, a second motor including a second fan, an inverter that applies voltage to the first motor and the second for respectively, a connection switching unit that switches the voltage applied to the second motor between on and off, and a control unit that controls the inverter and the connection switching unit. The inverter is disposed closer to the first motor than to the second motor.

13 Claims, 14 Drawing Sheets

(51) Int. Cl.
*F25B 49/02* (2006.01)
*H02P 5/46* (2006.01)
*F24F 1/22* (2011.01)

(52) U.S. Cl.
CPC ........ *H02P 5/46* (2013.01); *F25B 2313/0294* (2013.01); *F25B 2600/11* (2013.01)

(56) References Cited

U.S. PATENT DOCUMENTS

| | | |
|---|---|---|
| 2003/0102839 A1 | 6/2003 | Kinpara et al. |
| 2015/0028780 A1 | 1/2015 | Hatakeyama et al. |
| 2016/0174411 A1* | 6/2016 | Lee .................. F25B 21/02 165/80.5 |
| 2016/0248352 A1* | 8/2016 | Shinomoto ............. F25B 31/02 |
| 2017/0130975 A1* | 5/2017 | Shoemaker ............... F24F 1/50 |

FOREIGN PATENT DOCUMENTS

| | | | | |
|---|---|---|---|---|
| EP | 2 337 198 A2 | 6/2011 | | |
| EP | 3276279 A1 * | 1/2018 | ............. | F24D 17/02 |
| JP | H7-337091 A | 12/1995 | | |
| JP | 2556212 B2 | 9/1996 | | |
| JP | 2001-54299 A | 2/2001 | | |
| JP | 2004-187487 A | 7/2004 | | |
| JP | 2009-250521 A | 10/2009 | | |
| JP | 2009-284467 A | 12/2009 | | |
| JP | 4672236 B2 | 1/2011 | | |
| JP | 2011-72062 A | 4/2011 | | |
| JP | 2011-101550 A | 5/2011 | | |
| JP | 5732532 B2 | 4/2015 | | |
| JP | 2016-44818 A | 4/2016 | | |
| WO | 2013/132620 A1 | 9/2013 | | |

OTHER PUBLICATIONS

Japanese Office Action dated Mar. 9, 2021, issued in JP Patent Application No. 2020-522488 (and English Machine Translation).
International Search Report of the International Searching Authority dated Aug. 14, 2018 for the corresponding International application No. PCT/JP2018/020884 (and English translation).
Chinese Office Action dated Aug. 19, 2021, issued in corresponding CN Patent Application No. 201880093059.6 (and English machine translation).
Decision of Refusal issued Mar. 3, 2022 in corresponding CN Patent Application No. 201880093059.6 (with machine English translation).

\* cited by examiner

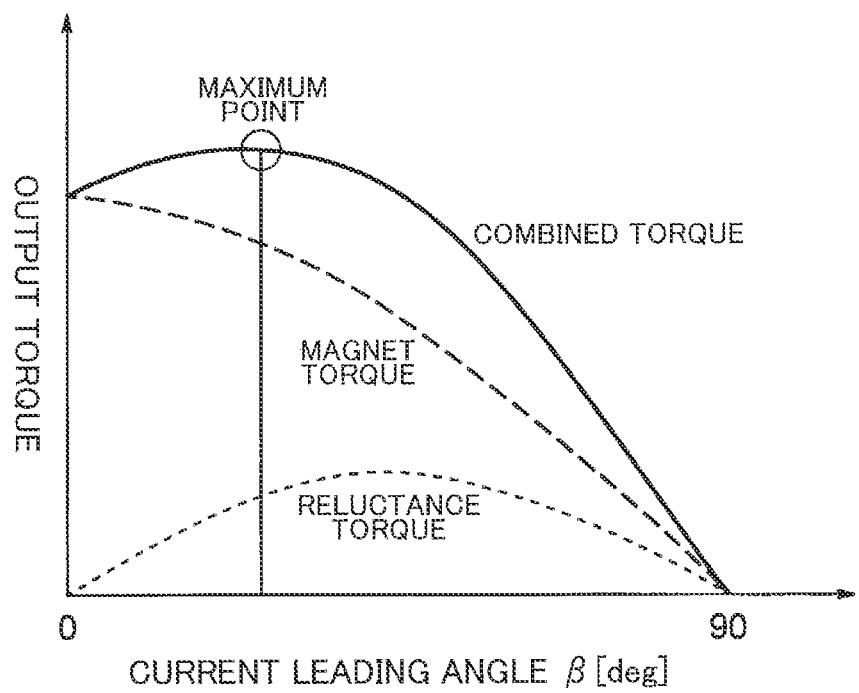

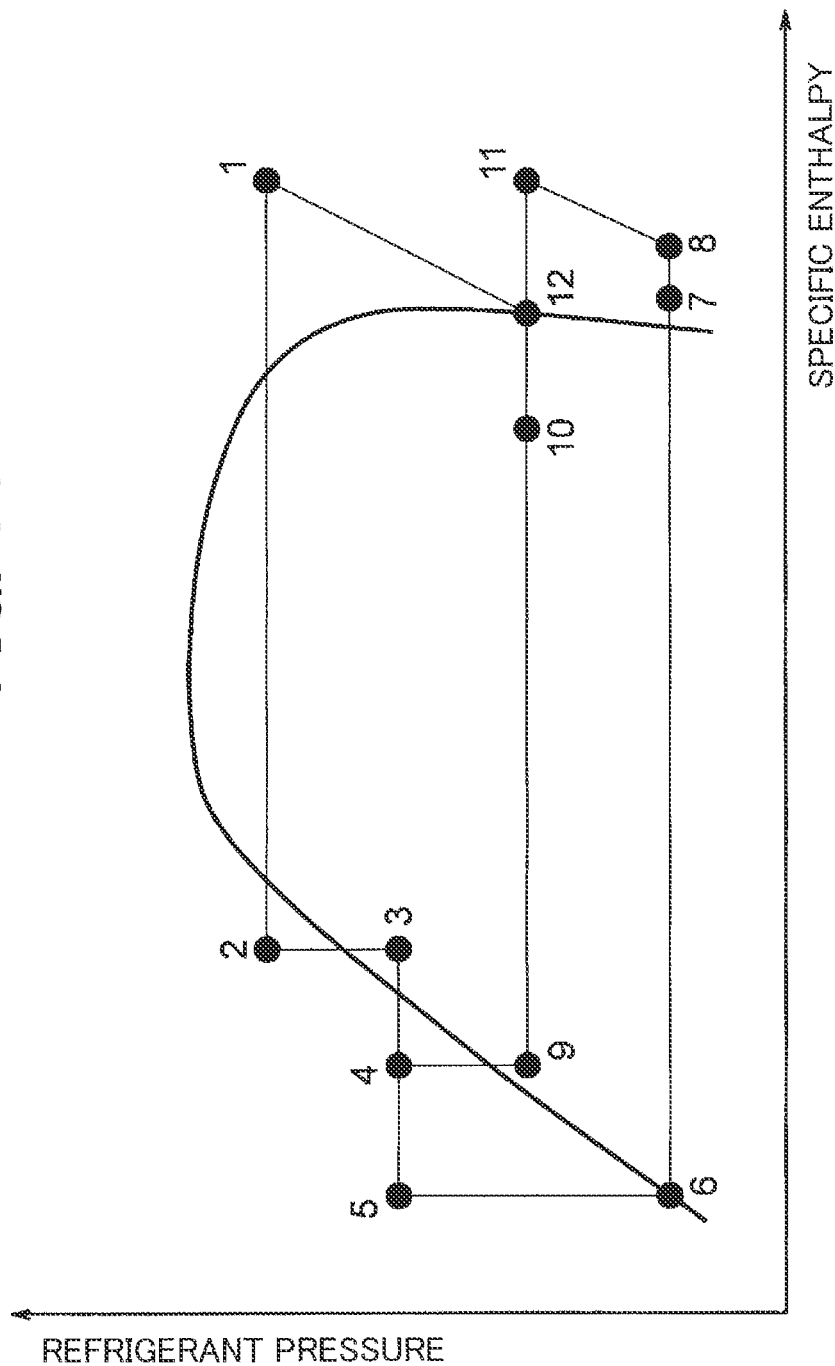

OUTDOOR UNIT FOR A REFRIGERATION CYCLE APPARATUS AND REFRIGERATING CYCLE DEVICE

CROSS REFERENCE TO RELATED APPLICATION

This application is a U.S. national stage application of International Patent Application No. PCT/JP2018/020884 filed on May 31, 2018, the disclosure of which is incorporated herein by reference.

TECHNICAL FIELD

The present invention relates to an outdoor unit and a refrigeration cycle apparatus including the outdoor unit.

BACKGROUND

A technology for making one inverter drive a plurality of motors is generally used. With this technology, even when the load concentrates on a particular motor, current supplied to each motor can be controlled with ease and each motor can be driven in a stable manner (see Patent Reference 1, for example). When this technology is applied to an outdoor unit for a refrigeration cycle apparatus, attaching a fan to each motor makes it possible to control the driving of the fans by use of one inverter. In other words, air currents generated by the fans can be controlled with one inverter.

PATENT REFERENCE

Patent Reference 1: Japanese Patent Application Publication No. 2001-54299

In an outdoor unit for a refrigeration cycle apparatus, when the driving of a first fan is continued and the driving of a second fan is stopped, it becomes unlikely that heat from the inverter is discharged by the air current generated by the second fan, and thus There is a problem in that cooling efficiency of a heat exchanger in the outdoor unit in regard to the second fan's side drops and heat exchange efficiency of the heat exchanger on the second fan's side drops.

SUMMARY

An object of the present invention, which has been made to resolve the above-described problem, is to increase the heat exchange efficiency of a heat exchanger on a second fan's side.

An outdoor unit according to the present invention is an outdoor unit for a refrigeration cycle apparatus, including:
 at least one heat exchanger;
 a first motor including a first rotor and a first fan, the first fan rotating together with the first rotor;
 a second motor including a second rotor and a second fan, the second fan rotating together with the second rotor;
 a first lead wire electrically connected to the first motor;
 a second lead wire electrically connected to the second motor;
 an inverter that applies voltage to the first motor and the second motor through the first lead wire and the second lead wire respectively;
 a connection switching unit that is electrically connected to the second lead wire and switches the voltage applied to the second motor between on and off; and
 a controller that controls the inverter and the connection switching unit,
 wherein a path through which an air current generated by the first fan passes extends from a lower side to an upper side in the outdoor unit,
 the path extending from the lower side to the upper side in the outdoor unit passes through the inverter and the at least one heat exchanger, and
 the inverter is disposed closer to the first motor than to the second motor.

According to the present invention, there is no inverter in a second path through which an air current generated by the second fan passes, and thus the heat exchange efficiency of the heat exchanger on the second fan's side can be increased.

BRIEF DESCRIPTION OF THE DRAWINGS

FIG. 4 is a Graph showing the relationship between a current leading angle and magnet torque, the relationship between the current leading angle and reluctance torque, and the relationship between the current leading angle and combined torque.

FIG. 14 is a Mollier diagram in regard to the condition of the refrigerant of a heat pump device shown in FIG. 13.

DETAILED DESCRIPTION

First Embodiment

Figure 1:
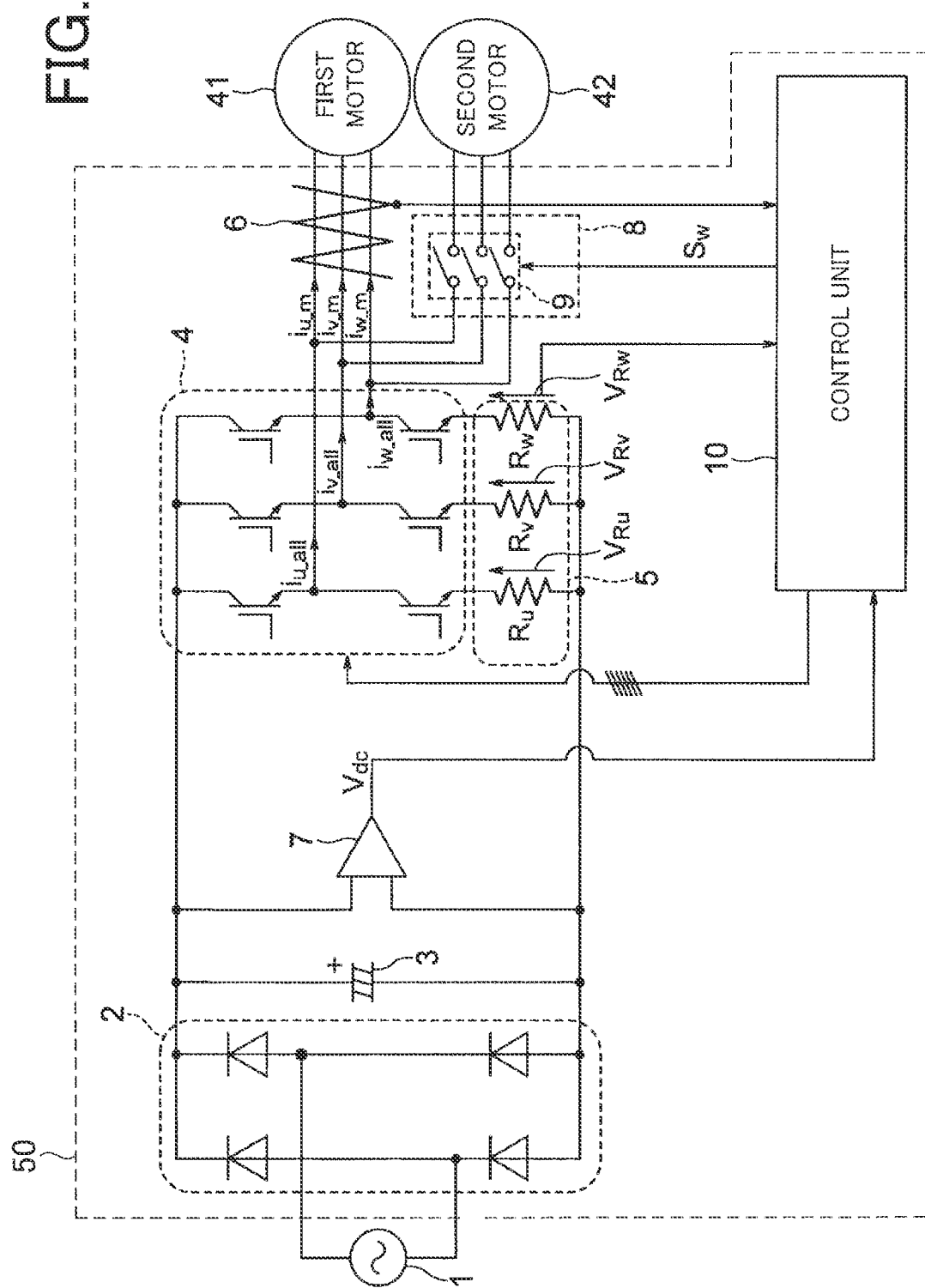
FIG. 1 is a diagram showing a motor driving device according to a first embodiment of the present invention.

FIG. 1 is a diagram showing a motor driving device 50 according to a first embodiment of the present invention. This motor driving device 50 is a device for driving a first motor 41 and a second motor 42. The first motor 41 and the second motor 42 are permanent magnet synchronous motors, for example. In this case, the first motor 41 and the second motor 42 include permanent magnets; each of a rotor of the first motor 41 and a rotor of the second motor 42 includes a permanent magnet.

The motor driving device 50 includes a rectifier 2, a smoothing unit 3, an inverter 4, an inverter current detection unit 5, a motor current detection unit 6, an input voltage detection unit 7, a connection switching unit 8 and a control unit 10.

The rectifier 2 rectifies AC power from an AC power supply 1 and thereby generates DC power.

The smoothing unit 3, formed of a capacitor or the like, smoothes the DC power from the rectifier 2 and supplies the smoothed DC power to the inverter 4.

Incidentally, while the AC power supply 1 is a single-phase power supply in the example of FIG. 1, the AC power supply may also be a three-phase power supply. When the AC power supply 1 is a three-phase power supply, a three-phase rectifier is used as the rectifier 2.

While an aluminum electrolytic capacitor having high capacitance is generally used as the capacitor of the smoothing unit 3 in many cases, a film capacitor having a long operating life may also be used. It is also possible to configure the smoothing unit 3 to inhibit harmonic current in the current flowing through the AC power supply 1 by using a capacitor having low capacitance.

Further, a reactor (not shown) may be inserted between the AC power supply 1 and the smoothing unit 3 in order to inhibit harmonic current or improve the power factor.

The inverter 4 receives voltage from the smoothing unit 3 as the input and outputs three-phase AC power whose frequency and voltage value are variable. The first motor 41 and the second motor 42 are parallelly connected to the output of the inverter 4.

The connection switching unit 8 is formed of a single open-close unit 9 in the example shown in FIG. 1. The open-close unit 9 is capable of opening and closing the connection between the second motor 42 and the inverter 4, and the number of motors operated at the same time can be switched by the opening and closing of the open-close unit 9.

The inverter 4 is formed of at least one of a semiconductor switching element or a freewheeling diode, for example. As the semiconductor switching element forming the inverter 4, an IGBT (Insulated Gate Bipolar Transistor) or a MOSFET (metal Oxide Semiconductor Field Effect Transistor) is used in many cases.

Incidentally, a freewheeling diode (not shown) may be connected in parallel with the semiconductor switching element for the purpose of inhibiting surge voltage caused by the switching of the semiconductor switching element.

It is also possible to use a parasitic diode of the semiconductor switching element as the freewheeling diode. In cases where a MOSFET is used, a function similar to the freewheeling diode can be implemented by switching the MOSFET to the ON state with the timing of the freewheeling.

The material forming the semiconductor switching element is not limited to silicon (Si); silicon carbide (SiC), gallium nitride (GaN), gallium oxide ($Ga_2O_3$), diamond or the like as a wide band gap semiconductor is usable, and the use of a wide band gap semiconductor makes it possible to realize low loss and high-speed switching.

Similarly, the material forming the freewheeling diode is not limited to silicon (Si); silicon carbide (SiC), gallium nitride (GaN), gallium oxide ($Ga_2O_3$), diamond or the like as a wide band gap semiconductor is usable, and the use of a wide band gap semiconductor makes it possible to realize low loss and high-speed switching.

As the open-close unit 9, an electromagnetic contactor such as a mechanical relay or a contactor may be used instead of the semiconductor switching element. In short, any type of component may be used as long as the same function is implemented.

While the open-close unit 9 is provided between the second motor 42 and the inverter 4 in the example shown in FIG. 1, it is also possible to provide the open-close unit 9 between the first motor 41 and the inverter 4. The connection switching unit 8 may also be configured to include two open-close units. In this case, it is possible to provide one open-close unit between the first motor 41 and the inverter 4 and the other open-close unit between the second motor 42 and the inverter 4. When two open-close units are used. The connection switching unit 8 is formed of the two open-close units.

While two motors are connected to the inverter 4 in the example shown in FIG. 1, it is also possible to connect three or more motors to the inverter 4. When three or more motors are connected to the inverter 4, an open-close unit similar to the open-close unit 9 may be provided between the inverter 4 and each of the motors. It is also possible to provide an open-close unit similar to the open-close unit 9 only between the inverter 4 and some of the motors. In these cases, the connection switching unit 8 is formed of a plurality of open-close units.

The inverter current detection unit 5 detects current flowing into the inverter 4. For example, the inverter current detection unit 5 obtains current $I_{u\_all}$, $I_{v\_all}$, $I_{w\_all}$ in each phase of the inverter 4 (inverter current) based on end-to-end voltages $V_{Ru}$, $V_{Rv}$ and $V_{Rw}$ of resistors $R_u$, $R_v$ and $R_w$ respectively connected in series with three lower arm switching elements of the inverter 4.

The motor current detection unit 6 detects current of the first motor 41. The motor current detection unit 6 includes three current transformers that respectively detect currents $i_{u\_m}$, $i_{v\_m}$ and $i_{w\_m}$ in the three phases (phase currents).

The input voltage detection unit 7 detects input voltage (DC bus voltage) $V_{dc}$ of the inverter 4.

The control unit 10 outputs a signal for operating the inverter 4 based on the current values detected by the inverter current detection unit 5, the current values detected by the motor current detection unit 6 and the voltage value detected by the input voltage detection unit 7.

Incidentally, while the inverter current detection unit 5 in the above example detects the current in each phase of the inverter 4 by using three resistors connected in series with the lower arm switching elements of the inverter 4, the inverter current detection unit 5 may also be configured to detect the current in each phase of the inverter 4 by using a resistor connected between a common connection point of the lower arm switching elements and a negative-side electrode of the smoothing unit 3.

Further, the motor driving device 50 may be provided with a motor current detection unit for detecting current of the second motor in addition to the motor current detection unit 6 for detecting the current of the first motor 41.

For the detection of the motor current, it is also possible to use a Hall element instead of the current transformer or to use a configuration for calculating current from end-to-end voltage of a resistor.

Similarly, for the detection of the inverter current, it is also possible to use a current transformer, a Hall element or the like instead of the configuration for calculating current from end-to-end voltage of a resistor.

The control unit 10 can be implemented by a processing circuit. The processing circuit may be formed of specialpurpose hardware, software, or a combination of hardware and software. In cases where the processing circuit is formed by software, the control unit 10 is formed of a microcomputer including a CPU (Central Processing Unit), a DSP (Digital Signal Processor), or the like. The control unit 10 may include a memory as a computer-readable record medium in addition to the CPU. In this case, the software can be stored in the memory as a program.

Figure 2:
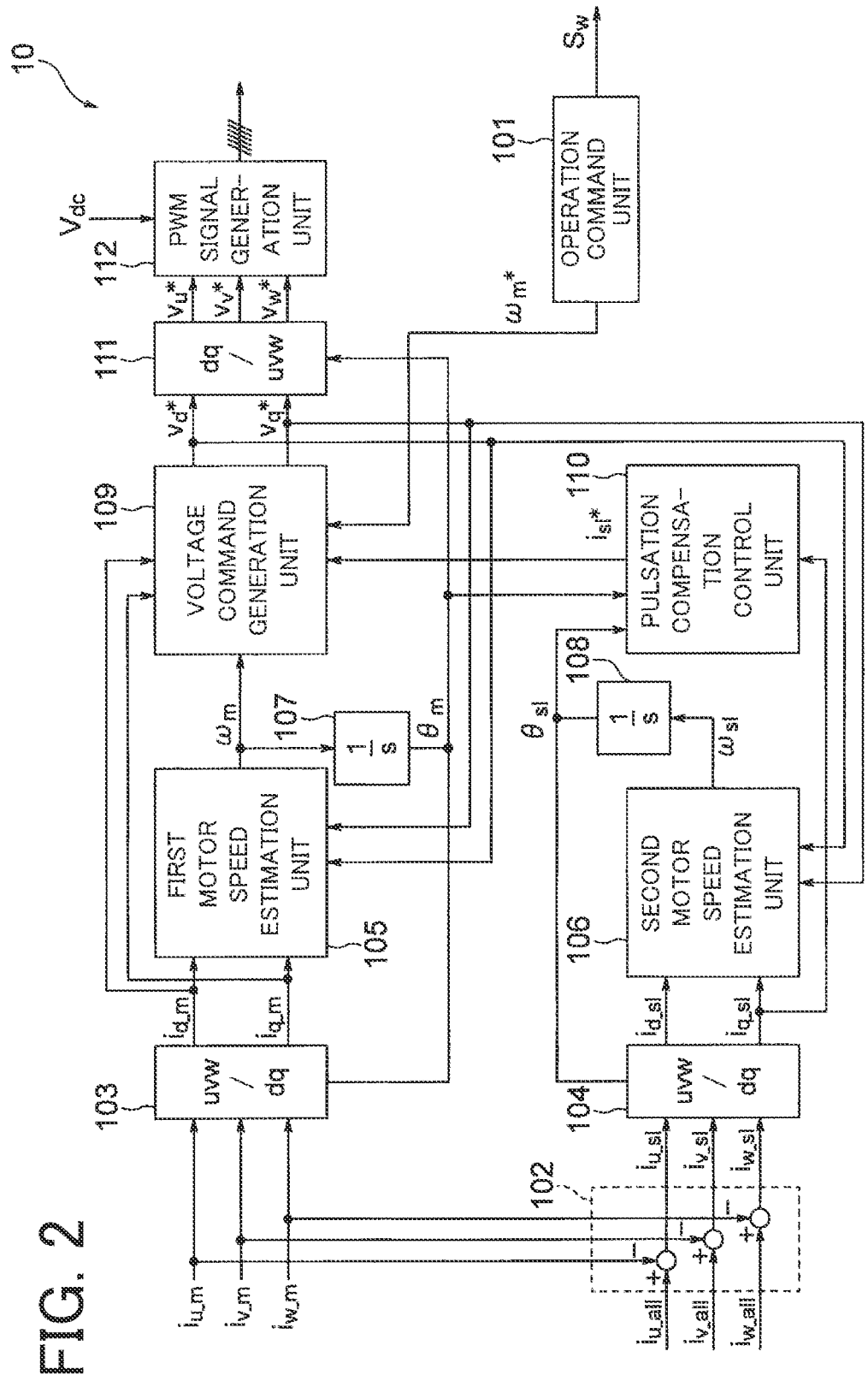
FIG. 2 is a functional block diagram showing the configuration of a control unit.

FIG. 2 is a functional block diagram showing the configuration of the control unit 10.

The control unit 10 includes an operation command unit 101, a subtraction unit 102, coordinate transformation units 103 and 104, a first motor speed estimation unit 105, a second motor speed estimation unit 106, integration units 107 and 108, a voltage command generation unit 109, a pulsation compensation control unit 110, a coordinate transformation unit 111 and a PWM signal generation unit 112.

The operation command unit 101 generates and outputs a revolution speed command value $\omega_m^*$ for a motor. The operation command unit 101 also generates and outputs a switching control signal Sw for controlling the connection switching unit 8.

The subtraction unit 102 obtains phase currents $i_{u\_sl}$, $i_{v\_sl}$ and $i_{w\_sl}$ of the second motor 42 by subtracting the phase currents $i_{u\_m}$, $i_{v\_m}$ and $i_{w\_m}$ of the first motor 41 from the phase currents $i_{u\_all}$, $i_{v\_all}$ and $i_{w\_all}$ of the inverter 4 detected by the inverter current detection unit 5.

This is calculation utilizing the relationship that the sum of the phase current $i_{u\_sl}$, $i_{v\_sl}$, $i_{w\_sl}$ of the first motor 41 and the phase current $i_{u\_sl}$, $i_{v\_sl}$, $i_{w\_sl}$ of the second motor 42 equals the phase current $i_{u\_all}$, $i_{v\_all}$, $i_{w\_all}$ of the inverter.

The coordinate transformation unit 103 obtains dq-axis currents $i_{d\_m}$ and $i_{q\_m}$ of the first motor 41 by coordinate-transforming the phase currents and $i_{u\_m}$, $i_{v\_m}$, $i_{w\_m}$ of the first motor 41 from a stationary three-phase coordinate system into a rotating two-phase coordinate system by using a phase estimate value (magnetic pole position estimate value) $\theta_m$ of the first motor 41 which will be described later.

The coordinate transformation unit 104 obtains dq-axis currents $i_{d\_sl}$ and $i_{q\_sl}$ of the second motor 42 by coordinate-transforming the phase currents $i_{u\_sl}$, $i_{v\_sl}$ and $i_{w\_sl}$ of the second motor 42 from the stationary three-phase coordinate system into the rotating two-phase coordinate system by using a phase estimate value (magnetic pole position estimate value) $\theta_{sl}$ of the second motor 42 which will be described later.

The first motor speed estimation unit 105 obtains a revolution speed estimate value $\omega_m$ of the first motor 41 based on the dq-axis currents $i_{d\_m}$ and $i_{q\_m}$ and dq-axis voltage command values $v_d^*$ and $v_q^*$ which will be described later.

Similarly, the second motor speed estimation unit 106 obtains a revolution speed estimate value $\omega_{sl}$ of the second motor 42 based on the dq-axis currents $i_{d\_sl}$ and $i_{q\_sl}$ and the dq-axis voltage command values $v_d^*$ and $v_q^*$ which will be described later.

The integration unit 107 obtains the phase estimate value $\theta_m$ of the first motor 41 by integrating the revolution speed estimate value $\omega_m$ of the first motor 41.

Similarly, the integration unit 108 obtains the phase estimate value $\theta_{sl}$ of the second motor 42 by integrating the revolution speed estimate value $\omega_{sl}$ of the second motor 42.

Incidentally, while the estimation of the revolution speed and the phase can be carried out by using a method described in Japanese Patent No. 4672236, for example, any method may be used as long as the revolution speed and the phase can be estimated. It is also possible to employ a method of directly detecting the revolution speed or the phase.

The voltage command generation unit 109 calculates the dq-axis voltage command values $v_d^*$ and $v_q^*$ based on the dq-axis currents $i_{d\_m}$ and $i_{q\_m}$ of the first motor 41, the revolution speed estimate value $\omega_m$ of the first motor 41, and a pulsation compensation current command value $i_{sl}^*$ which will be described later.

The coordinate transformation unit 111 obtains an applied voltage phase $\theta_v$ from the phase estimate value $\theta_m$ of the first motor 41 and the dq-axis voltage command values $v_u^*$ and $v_q^*$, and obtains voltage command values $v_u^*$, $v_v^*$ and $v_w^*$ in the stationary three-phase coordinate system by coordinate-transforming the dq-axis voltage command values $v_d^*$ and $v_q^*$ from the rotating two-phase coordinate system into the stationary three-phase coordinate system based on the applied voltage phase $\theta_v$.

The applied voltage phase $\theta_v$ is obtained by, for example, adding a leading phase angle $\theta_f$, which is obtained as $\theta_f = \tan^{-1}(v_q^*/v_d^*)$ from the dq-axis voltage command values $v_d^*$ and $v_q^*$, to the phase estimate value $\theta_m$ of the first motor 41.

Figures 3A, 3B, 3C:
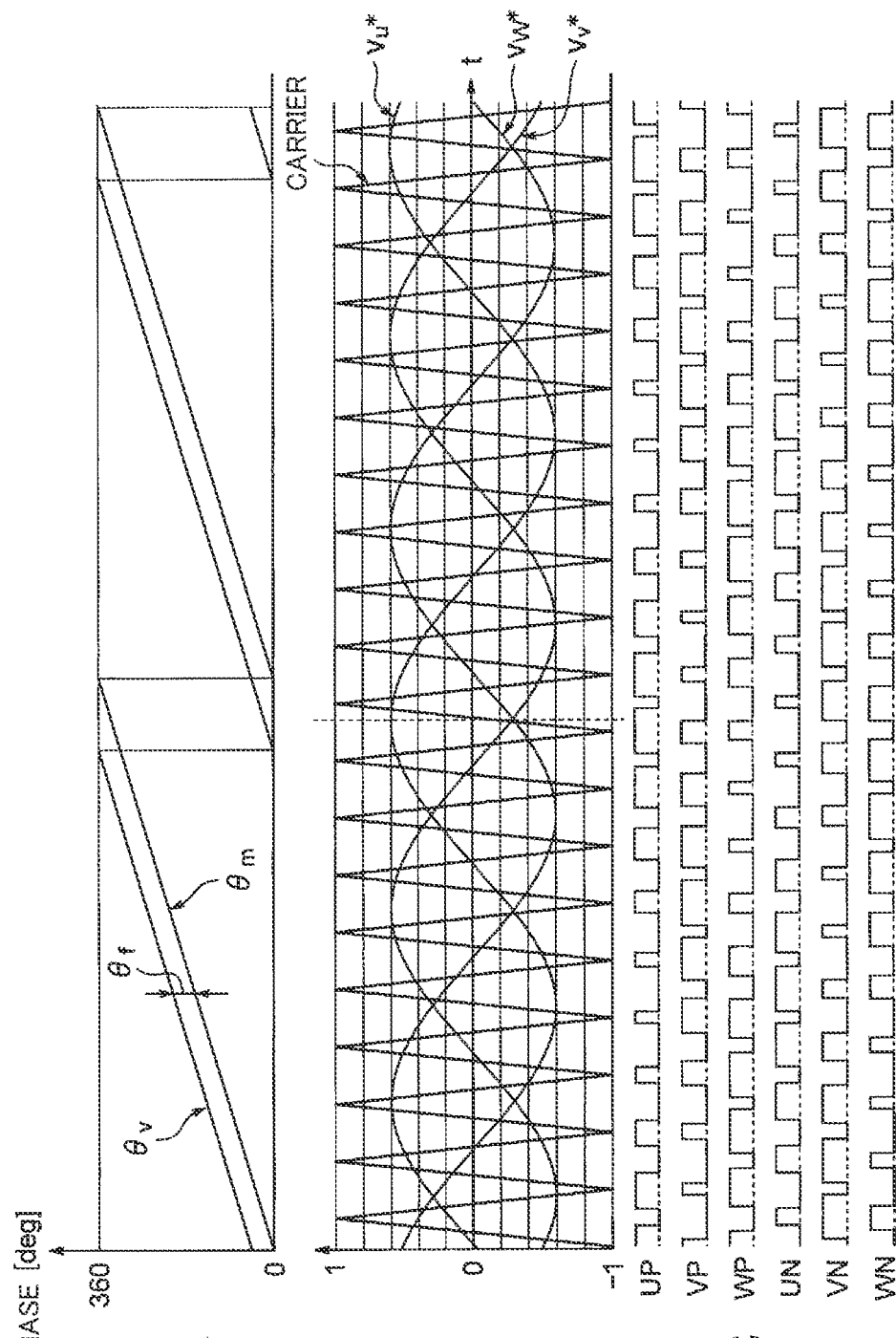
FIG. 3A is a diagram showing an example of a phase estimate value, a leading phase angle and an applied voltage phase.
FIG. 3B is a diagram showing an example of voltage command values obtained by a coordinate transformation unit.
FIG. 3C is a diagram showing an example of PWM signals.

FIG. 3A is a diagram showing an example of the phase estimate value $\theta_m$, the leading phase angle $\theta_f$ and the applied voltage phase $\theta_v$.

FIG. 3B is a diagram showing an example of the voltage command values $v_u^*$, $v_v^*$ and $v_w^*$ obtained by the coordinate transformation unit 111.

FIG. 3C is a diagram showing an example of PWM signals UP, VP, UP, UN, VN and UN.

The PWM signal generation unit 112 generates the PWM signals UP, VP, WP, UN, VN and UN shown in FIG. 3C from the input voltage $V_{dc}$ and the voltage command values $v_u^*$, $v_v^*$ and $v_w^*$.

The PWM signals UP, VP, WP, UN, VN and WN are supplied to the inverter 4 and used for controlling the switching elements.

The inverter 4 is provided with a non-illustrated drive circuit that generates drive signals for driving the switching elements of the arms based on the corresponding PWM signals UP, VP, WP, UN, VP and WN.

The control unit 10 controls the switching elements of the inverter 4 between on and off according to the aforementioned PWM signals UP, VP, WP, UN, VN and WN and thereby niches the inverter 4 output AC voltage whose frequency and voltage value are variable. Accordingly, the control unit 10 is capable of controlling the inverter 4 so that the AC voltage is applied to the first motor 41 and the second motor 42.

While the voltage command values $v_u^*$, $v_v^*$ and $v_w^*$ are sine waves in the example shown in FIG. 3B, the voltage command values may also be waves having a third-order harmonic superimposed thereon; waves of any waveform may be used as long as the driving of the first motor 41 and the second motor 42 is possible.

If the voltage command generation unit 109 is configured to generate the voltage command based exclusively on the dq-axis currents $i_{d\_m}$ and $i_{q\_m}$ and the revolution speed estimate value $\omega_m$ of the first motor 41, the first motor 41 is controlled appropriately, whereas the second motor 42 just operates according to the voltage command values generated for the first motor 41 and thus is in a state of not being directly controlled.

Therefore, the first motor 41 and the second motor 42 operate in a state with errors in the phase estimate value $\theta_m$ and the phase estimate value $\theta_{sl}$ and the errors become significant especially in a low speed range.

Upon the occurrence of the errors, current pulsation of the second motor 42 occurs and there is the danger of the step-out of the second motor 42 and an increase in the loss due to heating by overcurrent. Further, there is a danger that circuit breaking is carried out in response to the overcurrent, the motor is stopped, and the driving of the load becomes impossible.

The pulsation compensation control unit 110, which is provided in order to resolve such problems, outputs the pulsation compensation current command value $i_{sl}*$, for inhibiting the current pulsation of the second motor 42, by using the q-axis current $i_{q\_sl}$ of the second motor 42, the phase estimate value $\theta_m$ of the first motor 41 and the phase estimate value $\theta_{sl}$ of the second motor 42.

The pulsation compensation current command value $i_{sl}*$ is determined based on the result of a judgment on phase relationship between the first motor 41 and the second motor 42 made from the phase estimate value $\theta_m$ of the first motor 41 and the phase estimate value $\theta_{sl}$ of the second motor 42 so as to inhibit pulsation of the q-axis current $i_{q\_sl}$ that corresponds to torque current of the second motor 42.

The voltage command Generation unit 109 obtains a q-axis current command value $\theta_{q\_m}*$ for the first motor 41 by performing a proportional-integral operation on the deviation between the revolution speed command value $\omega_m*$ for the first motor 41 from the operation command unit 101 and the revolution speed estimate value $\omega_m$ of the first motor 41.

On the other hand, the d-axis current of the first motor 41 is an excitation current component, and changing its value makes it possible to control the current phase and to drive the first motor 41 by flux-strengthening control or flux-weakening control. By using this property and incorporating the aforementioned pulsation compensation current command value $i_{sl}*$ into a d-axis current command value $I_{d\_m}*$ for the first motor 41, it is possible to control the current phase and thereby reduce the pulsation.

The voltage command generation unit 109 obtains the dq-axis voltage command values $v_d*$ and $v_q*$ based on the dq-axis current command values $I_{d\_m}*$ and $I_{q\_m}*$ obtained as above and the dq-axis currents $i_{d\_m}$ and $i_{q\_m}$ obtained by the coordinate transformation unit 103. Namely, the d-axis voltage command value $v_d*$ is obtained by performing the proportional-integral operation on the deviation between the d-axis current command value $I_{d\_m}*$ and the d-axis current $I_{d\_m}$, and the q-axis voltage command value $v_q*$ is obtained by performing the proportional-integral operation on the deviation between the q-axis current command value $I_{q\_m}*$ and the q-axis current $I_{q\_m}$.

Incidentally, any configuration may be employed for the voltage command generation unit 109 and the pulsation compensation control unit 110 as long as the same functions can be implemented.

Performing the control described above makes it possible to drive the first motor 41 and the second motor 42 with one inverter 4 so that no pulsation occurs to the second motor 42.

Next, a problem in cases where the first motor 41 and the second motor 42 are embedded magnet synchronous motors will be described below.

FIG. 4 is a graph showing the relationship between a current leading angle β and magnet torque, the relationship between the current leading angle β and reluctance torque, and the relationship between the current leading angle β and combined torque.

An embedded magnet synchronous motor generates the reluctance torque due to the difference between d-axis inductance and q-axis inductance in addition to the magnet torque due to the magnets. The relationship between the current leading angle β and the magnet torque or the reluctance torque is as shown in FIG. 4, for example, and the combined torque hits the maximum at a certain current leading angle β between 0 [deg] and 90 [deg].

Here, the current leading angle β is a phase angle of the current in the direction of back electromotive force, that is, with reference to a +q axis, and in the range from 0 [deg] to 90 [deg], the current leading angle β increases with the increase in the absolute value of the d-axis current if the q-axis current is constant.

In cases of surface magnet synchronous motors, only the magnet torque is generated, and thus the combined torque hits the maximum when the current leading angle β is 0 [deg].

Second Embodiment

Figure 5:
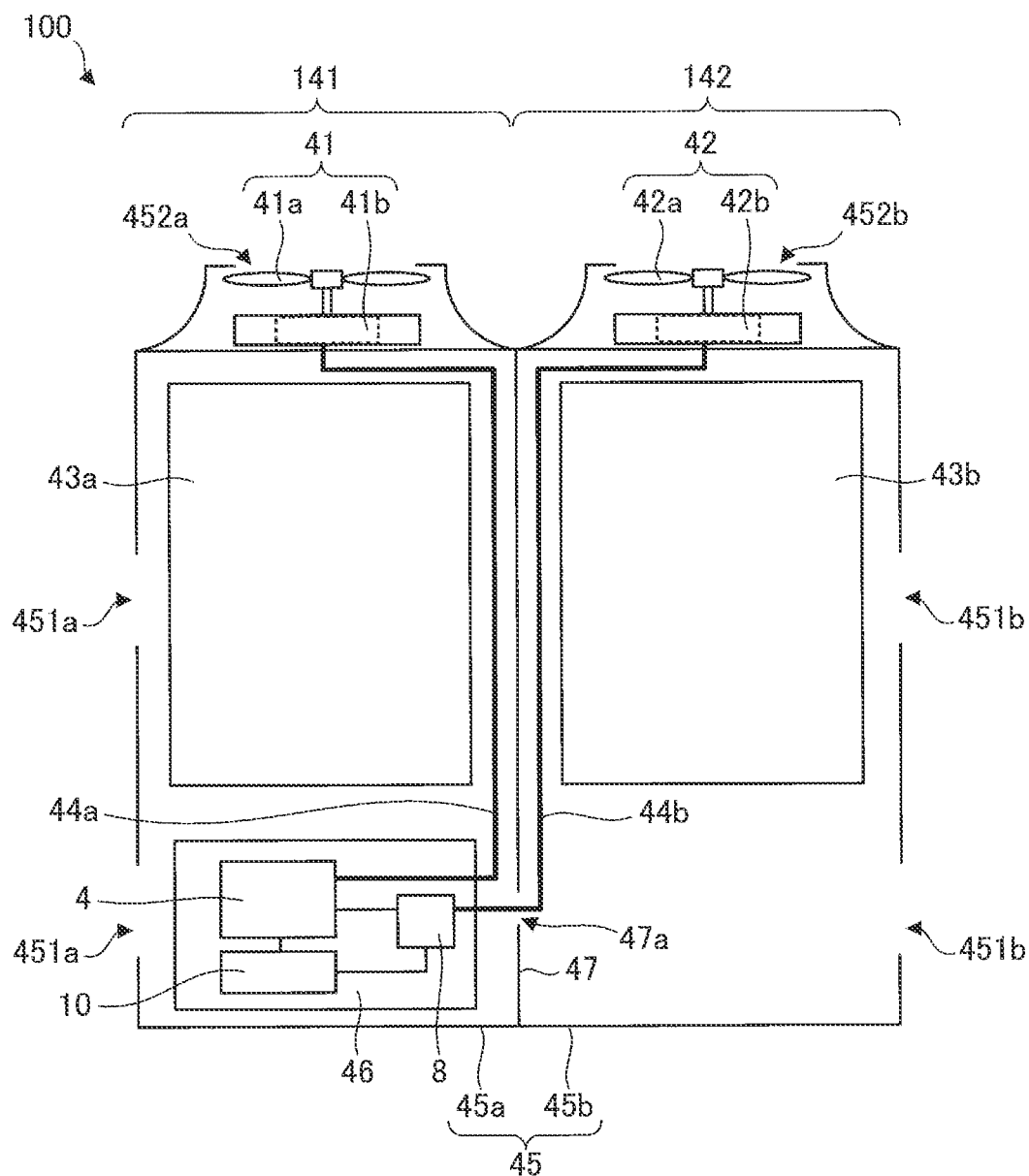
FIG. 5 is a diagram schematically showing internal structure of an outdoor unit according to a second embodiment.

FIG. 5 is a diagram schematically showing internal structure of an outdoor unit 100 according to a second embodiment.

The outdoor unit 100 is an outdoor unit for a refrigeration cycle apparatus. For example, the outdoor unit 100 is used together with an indoor unit in the refrigeration cycle apparatus. The outdoor unit 100 may include the motor driving device 50 described in the first embodiment. With this configuration, the outdoor unit 100 can obtain the advantages of the motor driving device 50 described in the first embodiment. In the outdoor unit 100 shown in FIG. 5, the first motor 41, the second motor 42, the inverter 4, the connection switching unit 8 and the control unit 10 are indicated among the components of the motor driving device 50 according to the first embodiment.

The outdoor unit 100 includes the first motor 41, the second motor 42, at least one heat exchanger (e.g., heat exchangers 43a and 43b), a first lead wire 44a, a second lead wire 44b, the inverter 4, the connection switching unit 8, the control unit 10, and a housing 45 covering these components.

The outdoor unit 100 further includes a substrate 46 and a partition plate 47. The inverter 4, the connection switching unit 8 and the control unit 10 are attached to the substrate 46.

Figure 6:
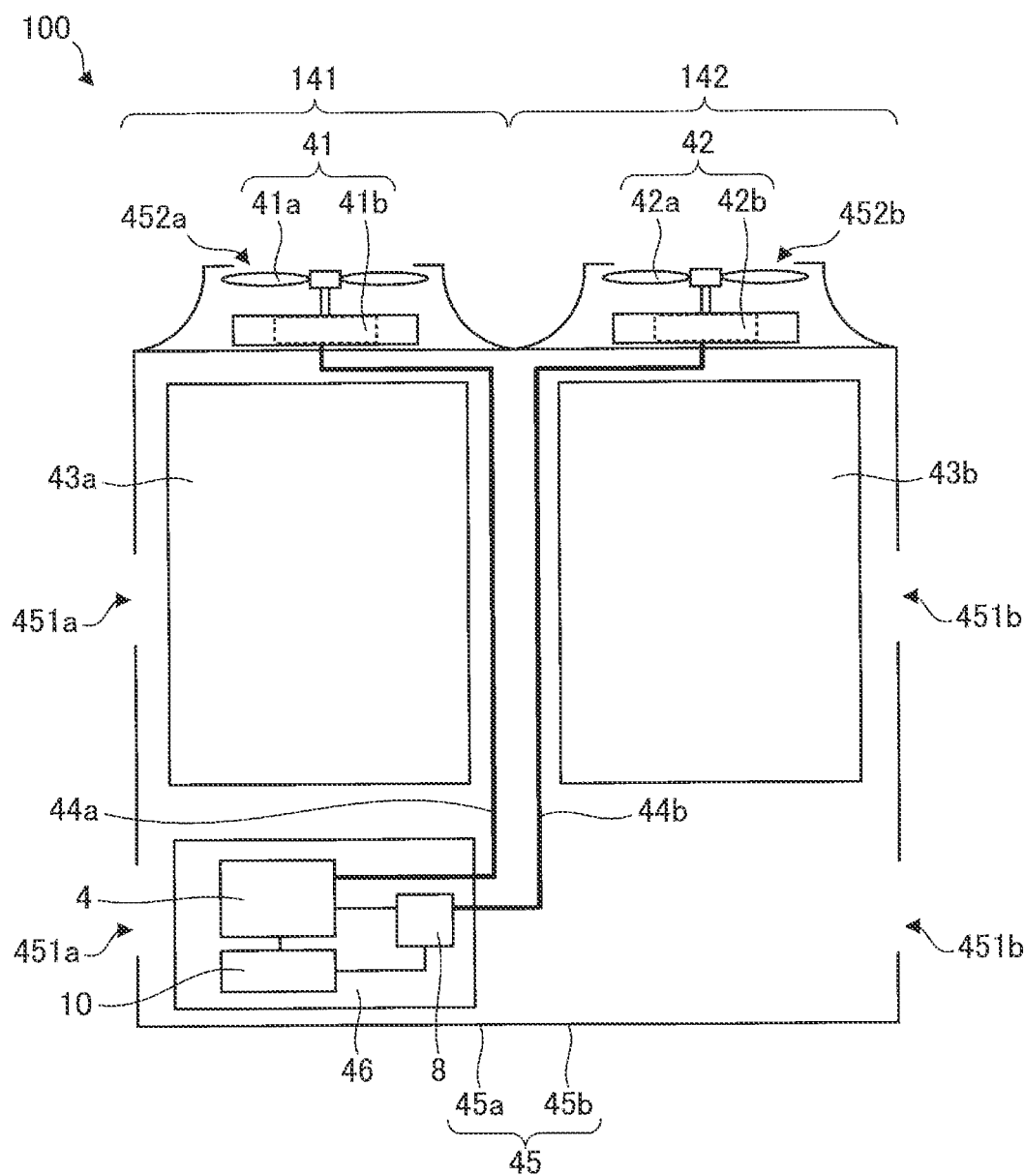
FIG. 6 is a diagram schematically showing another example of the internal structure of the outdoor unit.

FIG. 6 is a diagram schematically showing another example of the internal structure of the outdoor unit 100.

As show in FIG. 6, the outdoor unit 100 may also be configured to include no partition plate 47.

In this embodiment, the housing 45 is divided into a first housing 45a and a second housing 45b. The first housing 45a and the second housing 45b may either be separated from each other or integrated with each other.

The first housing 45a covers the first motor 41, the heat exchanger 43a and the inverter 4. In the example shown in FIG. 5, the first housing 45a covers the substrate 46. Thus, in the example shown in FIG. 5, the first housing 45a also covers the connection switching unit 8 and the control unit 10.

The second housing 45b covers the second motor 42 and the heat exchanger 43b.

The housing 45 has at least one first intake port 451a, at least one second intake port 451b, at least one first discharge port 452a and at least one second discharge port 452b.

In this embodiment, the first housing 45a has at least one first intake port 451a and at least one first discharge port 452a, and the second housing 45b has at least one second intake port 451b and at least one second discharge port 452b.

In cases where the housing 45 is separated into the first housing 45a and the second housing 45b, a unit including the first motor 41 is referred to as a first unit 141 and a unit including the second motor 42 is referred to as a second unit 142.

In the example shown in FIG. 5, the first unit 141 includes the first housing 45a, the first motor 41, the heat exchanger 43a, the first lead wire 44a, the inverter 4, the connection switching unit 8 and the control unit 10, and the second unit 142 includes the second housing 45b, the second motor 42 and the heat exchanger 43b.

In cases where the outdoor unit 100 is separated into the first unit 141 and the second unit 142, the partition plate 47 is the boundary between the first unit 141 and the second unit 142. However, the partition plate 47 may also be provided as a component of the first unit 141 or a component of the second unit 142. As shown in FIG. 6, the outdoor unit 100 may also be configured not to include the partition plate 47.

The first motor 41 includes a first fan 41a and a first rotor 41b. Further, the first motor 41 includes a shaft fixed to the first rotor 41b, and the shaft is fixed also to the first fan 41a. The first rotor 41b includes a permanent magnet. When the first motor is driven, the first fan 41a rotates together with the first rotor 41b. Accordingly, the first fan 41a generates an air current (namely, air current A1 which will be described later).

The second motor 42 includes a second fan 42a and a second rotor 42b. Further, the second motor 42 includes a shaft fixed to the second rotor 42b, and the shaft is fixed also to the second fan 42a. The second rotor 42b includes a permanent magnet. When the second motor 42 is driven, the second fan 42a rotates together with the second rotor 42b. Accordingly, the second fan 42a generates an air current (namely, air current A2 which will be described later).

The first lead wire 44a is electrically connected to the first motor 41 and the inverter 4. The second lead wire 44b is electrically connected to the second motor 42 and the connection switching unit 8. Specifically, as shown in FIG. 5, a hole 47a is formed through the partition plate 47, and the second lead wire 44b is connected to the second motor 42 and the connection switching unit 8 through the hole 47a. While the first lead wire 44a is shorter than the second lead wire 44b in the example shown in FIG. 5, the length of the first lead wire 44a may also be the same as that of the second lead wire 44b.

The connection switching unit 8 is electrically connected to the second lead wire 44b, the inverter 4 and the control unit 10. Specifically, the connection switching unit 8 is disposed between the inverter 4 and the second motor 42. The connection switching unit 8 switches the voltage applied from the inverter 4 to the second motor 42 between on and off according to a command from the control unit 10. The connection switching unit 8 is formed of a wide band gap semiconductor, for example. This makes it possible to realize low loss and high-speed switching.

The connection switching unit 8 may also be formed of an electromagnetic contactor. Also in this case, low loss and high-speed switching can be realized.

Figure 7:
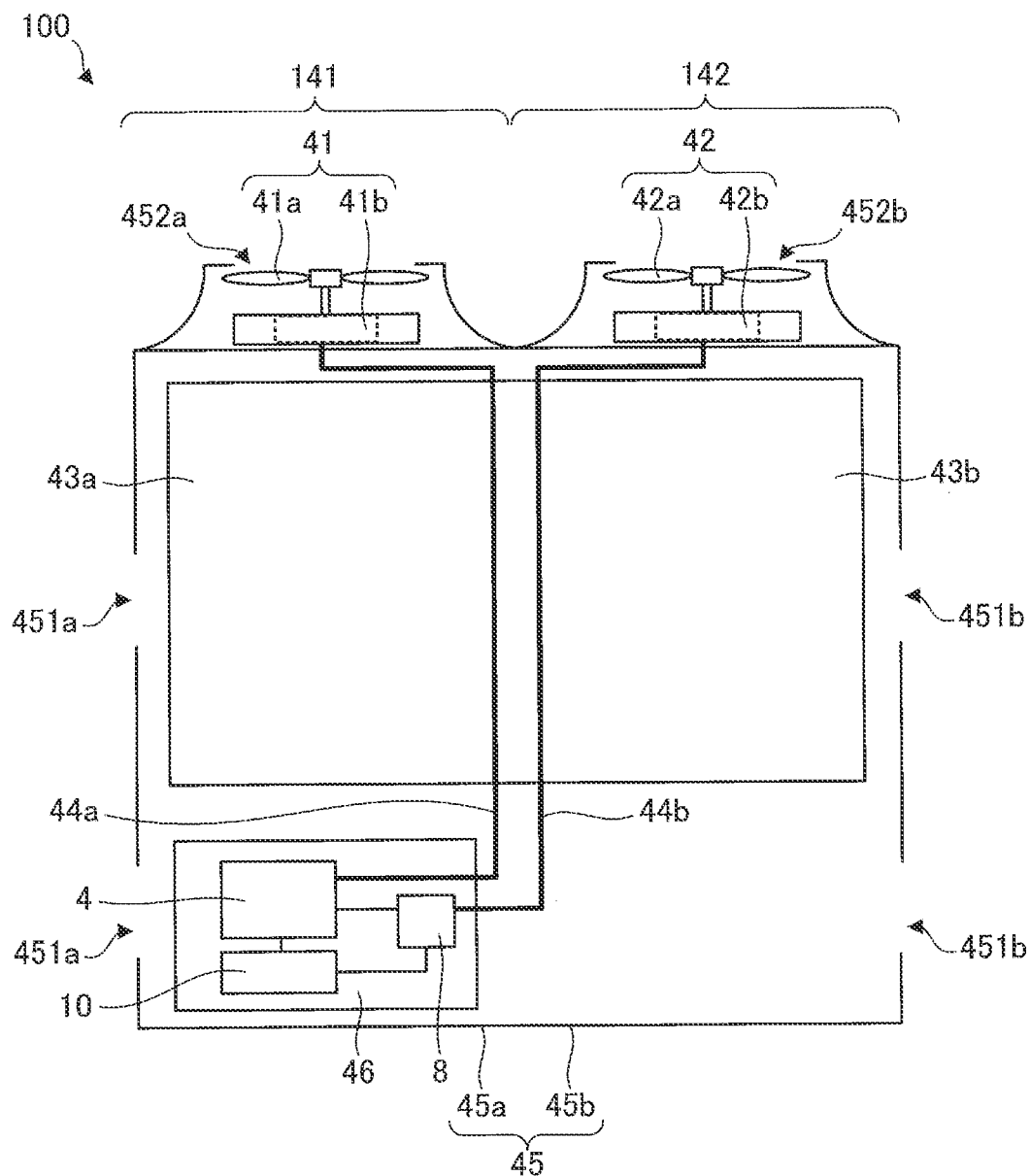
FIG. 7 is a diagram schematically showing still another example of the internal structure of the outdoor unit.

FIG. 7 is a diagram schematically showing still another example of the internal structure of the outdoor unit 100.

The "at least one heat exchanger" in the outdoor unit 100 may either be one heat exchanger or two or more heat exchangers. When the outdoor unit 100 includes one heat exchanger, the heat exchangers 43a and 43b are integrated with each other as shown in FIG. 7. In this case, the heat exchanger 43a is on the first fan 41a's side of the heat exchanger and the heat exchanger 43b is on the second fan 42a's side of the heat exchanger. The first fan 41a's side of the heat exchanger will be referred to also as "the first unit 141's side of the heat exchanger" or "the first side of the heat exchanger", and the second fan 42a's side of the heat exchanger will be referred to also as "the second unit 142's side of the heat exchanger" or "the second side of the heat exchanger".

The at least one heat exchanger performs heat exchange with a refrigerant. In this embodiment, the heat exchanger 43a performs the heat exchange with the refrigerant and the heat exchanger 43b also performs the heat exchange with the refrigerant.

The inverter 4 is capable of driving a plurality of motors as mentioned above. In this embodiment, the inverter 4 is capable of applying voltage to the first motor 41 and the second motor 42 through the first lead wire 44a and the second lead wire 44b respectively. In other words, the inverter 4 is capable of driving the first motor 41 and the second motor 42. However, in cases where the outdoor unit 100 includes three or more motors, the inverter 4 is capable of driving the three or more motors.

The inverter 4 is disposed closer to the first motor 41 than to the second motor 42. The arrangement of the inverter 4 is not limited to that in this embodiment as long as the inverter 4 is situated closer to the first motor 41 than to the second motor 42.

As described above, the control unit 10 controls the inverter 4 and the connection switching unit 8. The control unit 10 is disposed closer to the first motor 41 than to the second motor 42.

In the outdoor unit 100, a device including the inverter 4 and the control unit 10 will be referred to also as a "motor control device". In this embodiment, the motor control device is disposed closer to the first motor 41 than to the second motor 42.

In this embodiment, the substrate 46 is disposed closer to the first motor 41 than to the second motor 42. Thus, the connection switching unit 8 is also disposed closer to the first motor 41 than to the second motor 42.

Figure 8:
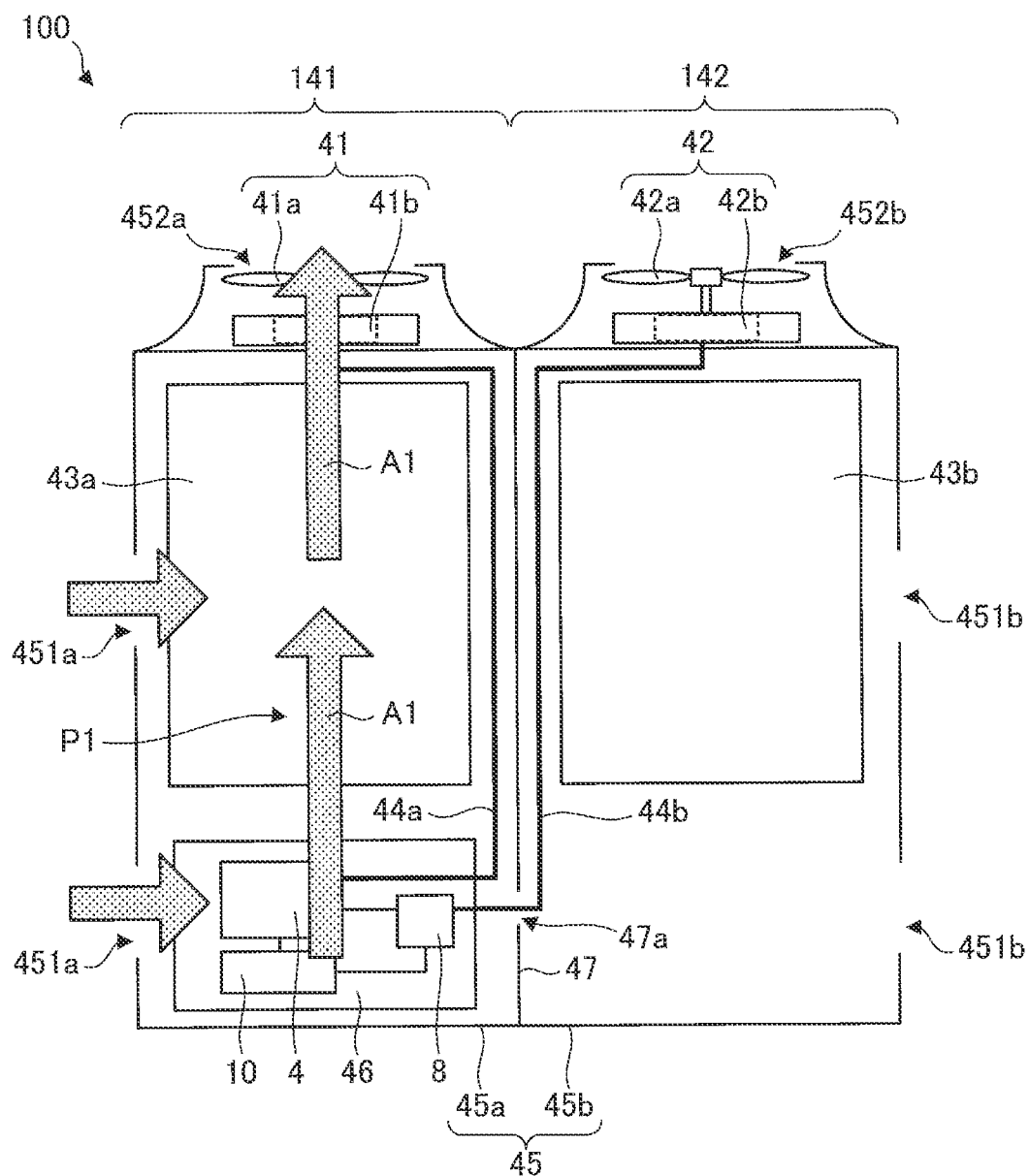
FIG. 8 is a diagram showing an example of the flow of air currents in the outdoor unit when a second motor is stopped.

FIG. 8 is a diagram showing an example of the flow of air currents in the outdoor unit 100 when the second motor 42 is stopped.

When the refrigeration cycle apparatus lowers its air-conditioning capacity, a motor among the plurality of motors that is driven by the control unit 10 is referred to as a master motor or a main motor, and a motor stopped by the control unit 10 is referred to as a slave motor or a subsidiary motor.

In this embodiment, when the refrigeration cycle apparatus lowers its air-conditioning capacity, one of the first motor 41 and the second motor 42 stops. In the example shown in FIG. 8, when the refrigeration cycle apparatus lowers its air-conditioning capacity, the first motor 41 is driven and the driving of the second motor 42 stops. In this case, the control unit 10 controls the inverter 4 and the connection switching unit 8 and thereby make them drive the first motor 41 and stop the second motor 42. Accordingly, the second fan 42a stops.

While the first motor 41 is driven, the first fan 41a rotates and an air current A1 occurs in the first unit 141. Specifically, air currents into the first unit 141 through the first intake port 451a and is discharged through the first discharge port 452a to the outside of the outdoor unit 100 (specifically, the first unit 141).

The path through which the air current A1 passes is a first path P1. In the example shown in FIG. 8, the air current A1 flows in the first unit 141 from a lower side to an upper side. Thus, the first path P1 extends from the lower side to the upper side in the first unit 141 in the example shown in FIG.

8. In other words, the first path P1 passes through the inverter 4 and the heat exchanger 43a. It is desirable that the first path P1 pass through the control unit 10 in addition to the inverter 4 and the heat exchanger 43a.

The air current A1 passes the inverter 4 and the heat exchanger 43a. Accordingly, the inverter 4 and the heat exchanger 43a are cooled down.

Figure 9:
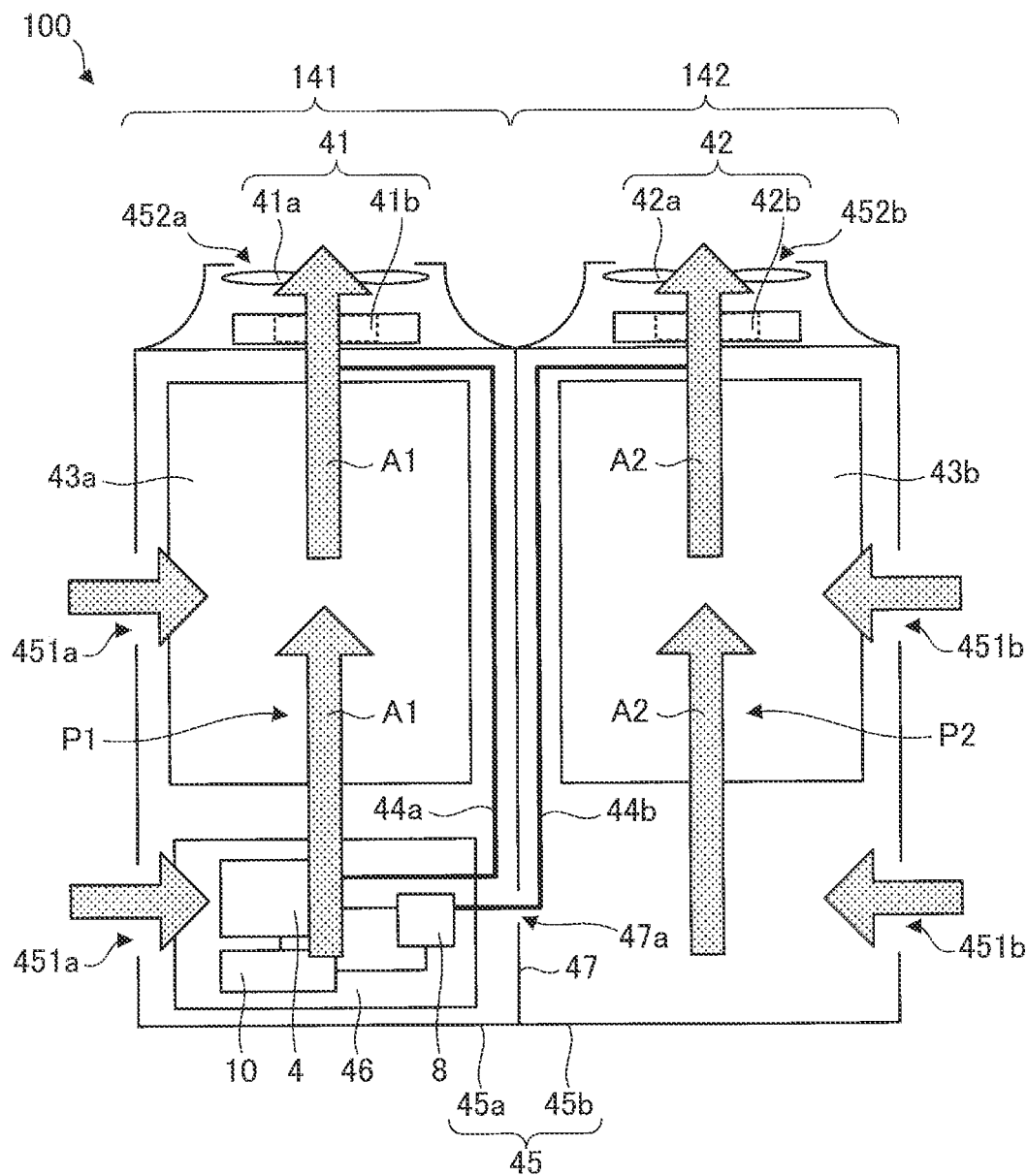
FIG. 9 is a diagram showing another example of the flow of air currents in the outdoor unit when a first motor and the second motor are driven.

FIG. 9 is a diagram showing another example of the flow of air currents in the outdoor unit 100 when the first motor 41 and the second motor 42 are driven.

In the example shown in FIG. 9, the first motor 41 and the second motor 42 are driven. For example, when the refrigeration cycle apparatus is maintained at a regular air-conditioning capacity or the air-conditioning capacity of the refrigeration cycle apparatus is raised, the control unit 10 controls the inverter 4 and the connection switching unit 8 and thereby makes them drive the first motor 41 and the second motor 42.

While the first motor 41 is driven, the first fan 41a rotates and the air current A1 occurs in the first unit 141. Specifically, air currents into the first unit 141 through the first intake port 451a and is discharged through the first discharge port 452a to the outside of the outdoor unit 100 (specifically, the first unit 141).

Similarly, while the second motor 42 is driven, the second fan 42a rotates and an air current A2 occurs in the second unit 142. Specifically, air currents into the second unit 142 through the second intake port 451b and is discharged through the second discharge port 452b to the outside of the outdoor unit 100 (specifically, the second unit 142).

The path through which the air current A2 passes is a second path P2. In the example shown in FIG. 9, the air current A2 flows in the second unit 142 from a lower side to an upper side. Thus, the second path P2 extends from the lower side to the upper side in the second unit 142 in the example shown in FIG. 9.

The air current A1 passes the inverter 4 and the heat exchanger 43a. Accordingly, the inverter 4 and the heat exchanger 43a are cooled down. The air current A2 passes the heat exchanger 43b. Accordingly, the heat exchanger 43b is cooled down.

Suppose that the inverter 4 and the control unit 10 are situated in the second path P2, heat from the substrate 46, especially heat from the inverter 4 and the control unit 10, is discharged to the inside of the second unit 142. If the second motor 42 stops in this state, the heat in the second unit 142 is unlikely to be discharged to the outside of the outdoor unit 100 (specifically, the second unit 142). Accordingly, cooling efficiency for the second unit 142's side of the heat exchanger (the heat exchanger 43b in this embodiment) drops and heat exchange efficiency on the second unit 142's side of the heat exchanger (the heat exchanger 43b in this embodiment) drops.

In contrast, in this embodiment, the inverter 4 is disposed closer to the first motor 41 than to the second motor 42. Specifically, the inverter 4 is situated in the first path P1, whereas the second path P2 includes no inverter 4. In this case, the heat from the inverter 4 is discharged mainly to the inside of the first unit 141, and thus the second unit 142's side of the heat exchanger (the heat exchanger 43b in this embodiment) is hardly influenced by the heat from the inverter 4. Therefore, even when the second motor 42 is stopped, the drop in the heat exchange efficiency on the second unit 142's side of the heat exchanger (the heat exchanger 43b in this embodiment) can be prevented. Consequently, the heat exchange efficiency on the second unit 142's side of the heat exchanger (the heat exchanger 43b in this embodiment) can be increased compared to the conventional technology.

Further, in this embodiment, the control unit 10 is disposed closer to the first motor 41 than to the second motor 42. Specifically, the control unit 10 is situated in the first path P1, whereas the second path 52 includes no control unit 10. In this case, the air current A1 passes the control unit 10 and the heat exchanger 43a. Heat from the control unit 10 is discharged mainly to the inside of the first unit 141, and thus the second unit 142's side of the heat exchanger (the heat exchanger 43b in this embodiment) is hardly influenced by the heat from the control unit 10. Therefore, even when the second motor 42 is stopped, the drop in the heat exchange efficiency on the second unit 142's side of the heat exchanger (the heat exchanger 43b in this embodiment) can be prevented. Consequently, the heat exchange efficiency on the second unit 142's side of the heat exchanger (the heat exchanger 43b in this embodiment) can be increased compared to the conventional technology.

Furthermore, it is desirable that the substrate 46 be disposed closer to the first motor 41 than to the second motor 42 as in this embodiment. In this case, the air current A1 passes the substrate 46 and the heat exchanger 43a. Heat from the substrate 46 is discharged mainly to the inside of the first unit 141, and thus the second unit 142's side of the heat exchanger (the heat exchanger 43b in this embodiment) is hardly influenced by the heat from the substrate 46. Therefore, even when the second motor 42 is stopped, the drop in the heat exchange efficiency on the second unit 142's side of the heat exchanger (the heat exchanger 43b in this embodiment) can be prevented. Consequently, the heat exchange efficiency on the second unit 142's side of the heat exchanger (the heat exchanger 43b in this embodiment) can be increased compared to the conventional technology. By disposing the substrate 46 not in the second unit 142 but in the first unit 141 as in this embodiment, the heat exchange efficiency on the second unit 142's side of the heat exchanger (the heat exchanger 43b in this embodiment) can be increased further.

As described above, in the outdoor unit 100 according to this embodiment, even when the second motor 42 is stopped, the cooling of the inside of tee outdoor unit 100 can be carried out efficiently, and consequently, the heat exchange efficiency of the heat exchanger, especially on the second unit 142's side of the heat exchanger (the heat exchanger 43b in this embodiment), can be increased.

Next, the structure of the first lead wire 44a and the structure of the second lead wire 44b will be described below.

Figure 10:
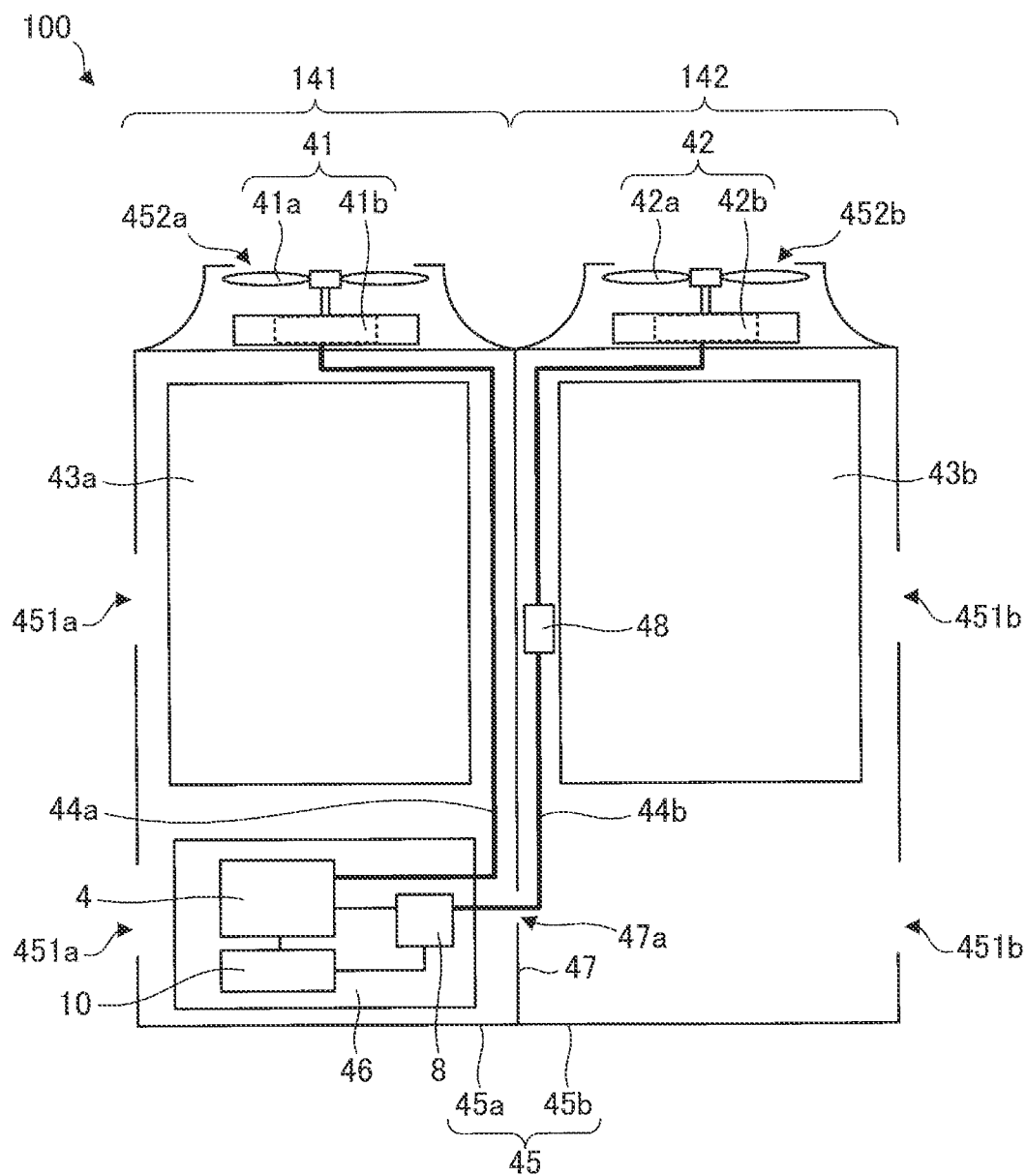
FIG. 10 is a diagram showing still another example of the internal structure of the outdoor unit.

FIG. 10 is a diagram showing still another example of the internal structure of the outdoor unit 100.

As described above, the inverter 4 is disposed closer to the first motor 41 than to the second motor 42. This configuration allows the length of the first lead wire 44a to be less than that of the second lead wire 44b. However, when the length of the first lead wire 44a and the length of the second lead wire 44b differ from each other, noise current passing through the first lead wire 44a can be superimposed on signal current passing through the second lead wire 44b. In this case, the signal current flowing through the second lead wire 44b is influenced by noise from the first lead wire 44a. Similarly, when the length of the first lead wire 44a and the length of the second lead wire 44b differ from each other, noise current passing through the second lead wire 44b can be superimposed on signal current passing through the first lead wire 44a. In this case, the signal current flowing through the first lead wire 44a is influenced by noise from the second lead wire 44b.

In the example shown in FIG. 10, the outdoor unit 100 includes a core 48 that reduces the noise current. The core 48 is a ferrite core, for example. The core 48 is referred to also as a noise filter.

In the example shown in FIG. 10, the core 48 is attached to the second lead wire 44b. Thus, the core 48 reduces the noise current flowing through the second lead wire 44b. With this configuration, the noise from the second lead wire 44b can be reduced even when the first lead wire 44a is shorter than the second lead wire 44b. It is also possible to at the core 48 to the first lead wire 44a. In this case, the noise from the first lead wire 44a can be reduced. Accordingly, appropriate control of the first motor 41 and the second motor 42 becomes possible.

Figure 11:
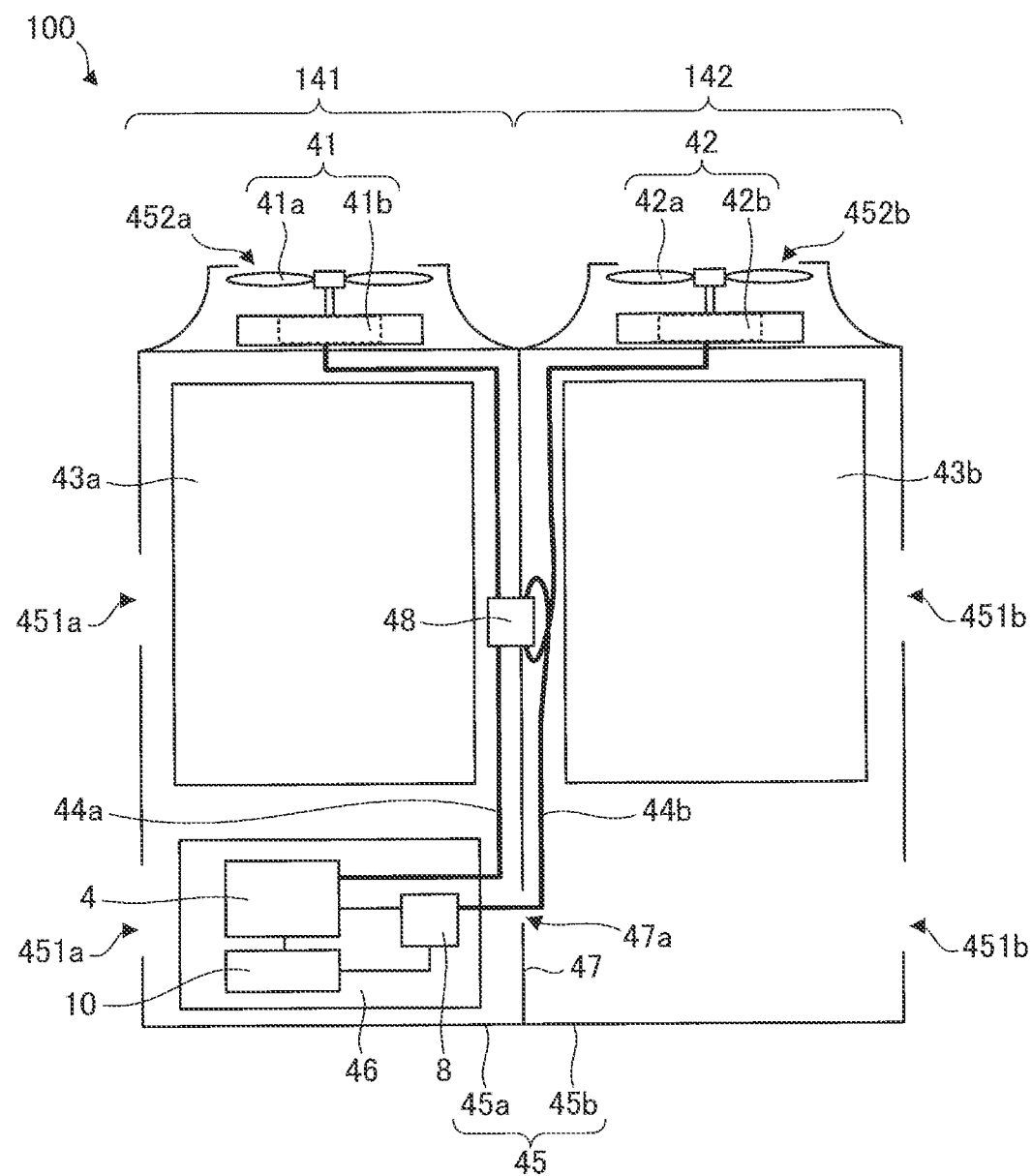
FIG. 11 is a diagram showing still another example of the internal structure of the outdoor unit.

FIG. 11 is a diagram showing still another example of the internal structure of the outdoor unit 100.

Figure 12:
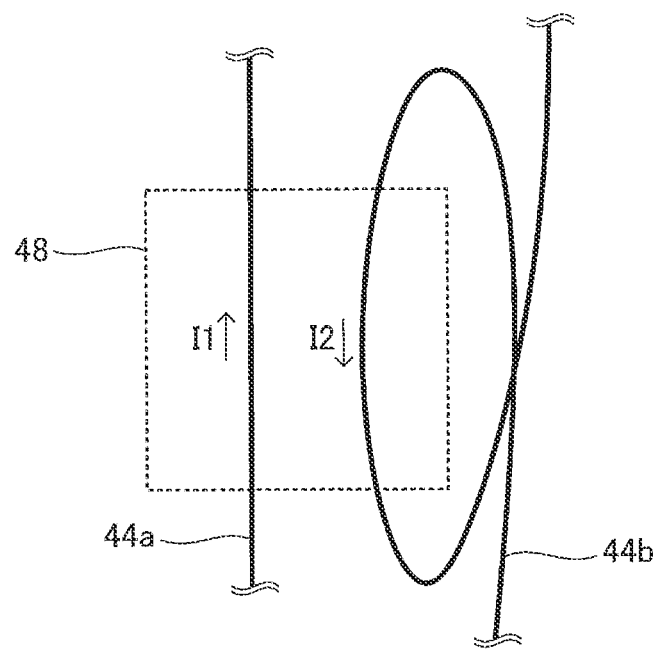
FIG. 12 is a diagram showing the direction of current flowing through a first lead wire and the direction of current flowing through a second lead wire in a core.

FIG. 12 is a diagram showing the direction of current I1 flowing through the first lead wire 44a and the direction of current I2 flowing through the second lead wire 44b in the core 48.

In the example shown in FIG. 11, the length of the first lead wire 44a is the same as that of the second lead wire 44b, and the current (specifically, signal current) flowing through the first lead wire 44a is in sync with the current (specifically, signal current) flowing through the second lead wire 44b. For example, the same current is supplied from the inverter 4 to the first lead wire 44a and the second lead wire 44b. Namely, the first motor 41 and the second motor 42 perform synchronized operation. In this case, the signal current flowing through the first lead wire 44a can be influenced by the noise from the second lead wire 44b, and the signal current flowing through the second lead wire 44b can be influenced by the noise from the first lead wire 44a.

Therefore, in the example shown in FIG. 11, the outdoor unit 100 includes the core 48 for reducing the noise current. The core 48 is attached to the first lead wire 44a and the second lead wire 44b. Specifically, as shown in FIG. 12, the core 48 is attached to the first lead wire 44a and the second lead wire 44b so that the current I1 flowing through the first lead wire 44a and the current I2 flowing through the second lead wire 44b are in directions opposite to each other in the core 48. The current I1 includes the signal current and the noise current. Similarly, the current I2 includes the signal current and the noise current.

In the core 48, the current I1 and the current I2 are in directions opposite to each other and the current (specifically, signal current) flowing through the first lead wire 44a is in sync with the current (specifically, signal current) flowing through the second lead wire 44b, and thus magnetic flux generated by the current I1 and magnetic flux generated by the current I2 cancel each other. Accordingly, the noise from the first lead wire 44a and the noise from the second lead wire 44b cancel each other. Consequently, the influence of the noise in the first lead wire 44a and the second lead wire 44b can be reduced. This enables appropriate control of the first motor 41 and the second motor 42.

Third Embodiment

A refrigeration cycle apparatus 800 according to a third embodiment will be described below. The refrigeration cycle apparatus 800 is referred to also as a refrigeration cycle application apparatus.

Figure 13:
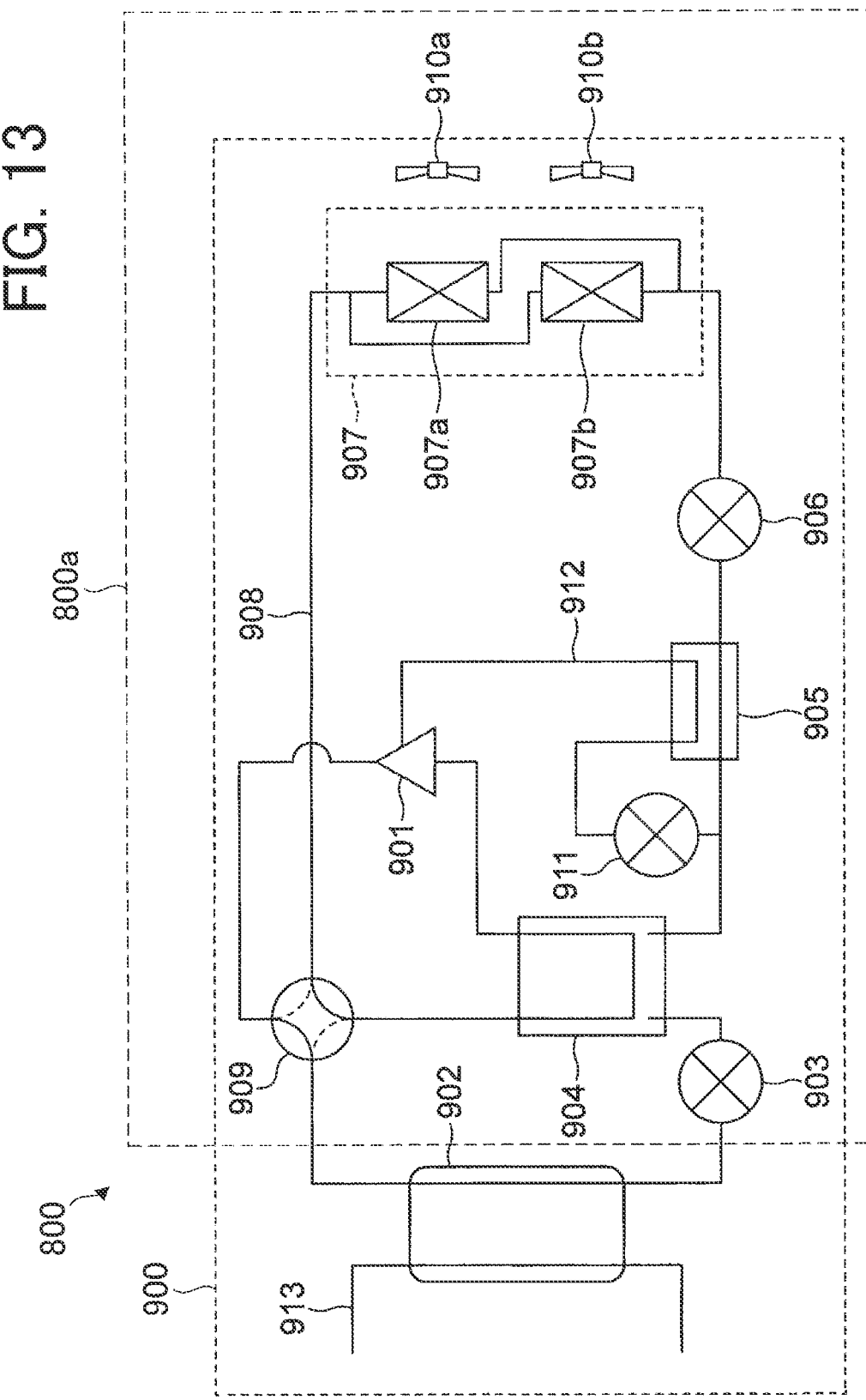
FIG. 13 is a diagram showing an example of the configuration of a refrigeration cycle apparatus according to a third embodiment.

FIG. 13 is a diagram showing an example of the configuration of the refrigeration cycle apparatus 800 according to the third embodiment.

The refrigeration cycle apparatus 800 includes a heat pump device 900. In this embodiment, some components of the heat pump device 900 form an outdoor unit 800a of the refrigeration cycle apparatus 800. The refrigeration cycle apparatus 800 includes an indoor unit (not shown) in addition to the outdoor unit 800a.

The outdoor unit 100 described in the second embodiment can be employed as the outdoor unit 800. This allows the refrigeration cycle apparatus 800 to obtain the advantages of the outdoor unit 100 described in the second embodiment. In the example shown in FIG. 13, a heat exchanger 907 corresponds to the heat exchangers 43a and 43b of the outdoor unit 100 according to the second embodiment, and fans 910a and 910b correspond to the first fan 41a and the second fan 42a of the outdoor unit 100 according to the second embodiment.

FIG. 14 is a Mollier diagram in regard to the condition of the refrigerant of the heat pump device 900 shown in FIG. 13. In FIG. 14, the horizontal axis represents specific enthalpy and the vertical axis represents refrigerant pressure.

An example of the circuit configuration of the heat pump device 900 will, be described below.

The heat pump device 900 includes a main refrigerant circuit 908 in which a compressor 901, a heat exchanger 902, an expansion mechanism 903, a receiver 904, an internal heat exchanger 905, an expansion mechanism 906 and the heat exchanger 907 are successively connected together by piping and the refrigerant circulates. Incidentally, in the main refrigerant circuit 908, a four-way valve 909 is provided on a discharging side of the compressor 901 so that the circulating direction of the refrigerant can be switched.

The outdoor unit 800a of the refrigeration cycle apparatus 800 includes the compressor 901, the expansion mechanism 903, the receiver 904, the internal heat exchanger 905, the expansion mechanism 906, the heat exchanger 907, the four-way valve 909, an expansion mechanism 911, the fan 910a and the fan 910b of the heat pump device 900. However, the configuration of the outdoor unit 800a is not limited to that in this embodiment.

The heat exchanger 907 includes a first part 907a and a second part 907b, non-illustrated valves are connected to them, and the flow of the refrigerant is controlled depending on the load on the heat pump device 900. For example, the refrigerant is fed to both of the first part 907a and the second part 907b when the load on the heat pump device 900 is relatively high, and the refrigerant is fed only to one of the first part 907a and the second part 907b, e.g., only to the first part 907a, when the load on the heat pump device 900 is relatively low.

The first part 907a and the second part 907b are respectively provided with their corresponding fans 910a and 910b placed in the vicinity thereof. The fans 910a and 910b are respectively driven by driving force of separate motors. For example, the fan 910a is the first fan 41a of the first motor 41 described in the first or second embodiment, and the fan 910b is the second fan 42a of the second motor 42 described in the first or second embodiment.

Further, the heat pump device 900 includes an injection circuit 912 that connects a connection point between the receiver 904 and the internal heat exchanger 905 and an injection pipe of the compressor 901 by using piping. The expansion mechanism 911 and the internal heat exchanger 905 are connected to the injection circuit 912 in sequence.

A water circuit 913 in which water circulates is connected to the heat exchanger 902. Incidentally, a device that uses water, such as a hot-water supply system, a radiator or a floor heating system, is connected to the water circuit 913.

First, the operation of the heat pump device 900 in a heating operation will be described below in the heating operation, the four-way valve 909 is set in the direction of the solid lines. Incidentally, this heating operation includes not only the heating used for the air conditioning but also heating of water for the hot-water supply.

Gas-phase refrigerant that reached high temperature and high pressure (point 1 in FIG. 14) in the compressor 901 is discharged from the compressor 901 and is liquefied (point 2 in FIG. 14) by heat exchange by the heat exchanger 902 functioning as a condenser and a radiator. At that time, by the heat radiated from the refrigerant, the water circulating in the water circuit 913 is heated up, and the heated water is used for the heating, the hot-water supply or the like.

The liquid-phase refrigerant after the liquefaction by the heat exchanger 902 is decompressed by the expansion mechanism 903 and shifts to a gas-liquid two-phase state (point 3 in FIG. 14). The refrigerant after shifting to the gas-liquid two-phase state in the expansion mechanism 903 undergoes heat exchange by the receiver 904 with refrigerant being taken into the compressor 901, and is thereby cooled down and liquefied (point 4 in FIG. 14). The liquid-phase refrigerant after the liquefaction by the receiver 904 branches and flows into the main refrigerant circuit 908 and the injection circuit 912.

The liquid-phase refrigerant flowing in the main refrigerant circuit 908 undergoes heat exchange by the internal heat exchanger 905 with refrigerant decompressed by the expansion mechanism 911 into the gas-liquid two-phase state and flowing in the injection circuit 912, and is thereby cooled down further (point 5 in FIG. 14). The liquid-phase refrigerant after being cooled down by the internal heat exchanger 905 is decompressed by the expansion mechanism 906 and shifts to the gas-liquid two-phase state (point 6 in FIG. 14). The refrigerant after shifting to the gas-liquid two-phase state in the expansion mechanism 906 undergoes heat exchange by the heat exchanger 907 as an evaporator with outside air and is thereby heated up (point 7 in FIG. 14). Then, the refrigerant after being heated up by the heat exchanger 907 is heated further (point 8 in FIG. 14) by the receiver 904 and is taken into the compressor 901.

Meanwhile, the refrigerant flowing in the injection circuit 912 is decompressed by the expansion mechanism 911 (point 9 in FIG. 14) and undergoes heat exchange by the internal heat exchanger 905 (point 10 in FIG. 14) as mentioned above. The refrigerant in the gas-liquid two-phase state after the heat exchange by the internal heat exchanger 905 (injection refrigerant) flows into the compressor 901 through the injection pipe of the compressor 901 while remaining in the gas-liquid two-phase state.

In the compressor 901, the refrigerant taken in from the main refrigerant circuit 908 (point 8 in FIG. 14) is compressed and heated to intermediate pressure (point 11 in FIG. 14). The refrigerant compressed and heated to the intermediate pressure (point 11 in FIG. 14) merges with the injection refrigerant (point 10 in FIG. 14) and drops in temperature (point 12 in FIG. 14). Then, the refrigerant after the temperature drop (point 12 in FIG. 14) is further compressed and heated into high temperature and high pressure and is discharged (point 1 in FIG. 14).

Incidentally, when the injection operation is not performed, the degree of opening of the expansion mechanism 911 is set to be fully closed. Specifically, while the degree of opening of the expansion mechanism 911 is larger than a certain value when the injection operation is performed, the degree of opening of the expansion mechanism 911 is set less than the certain value when the injection operation is not performed. This prevents the refrigerant from flowing into the injection pipe of the compressor 901. The degree of opening of the expansion mechanism 911 is electronically controlled by a control unit formed of a microcomputer or the like.

Next, the operation of the heat pump device 900 in a cooling operation will be described below. In the cooling operation, the four-way valve 909 is set in the direction of the broken lines. Incidentally, this cooling operation includes not only the cooling used for the air conditioning but also cooling of water, refrigeration of food, and so on.

Gas-phase refrigerant that reached high temperature and high pressure (point 1 in FIG. 14) in the compressor 901 is discharged from the compressor 901 and is liquefied (point 2 in FIG. 14) by heat exchange by the heat exchanger 907 functioning as a condenser and a radiator. The liquid-phase refrigerant after the liquefaction by the heat exchanger 907 is decompressed by the expansion mechanism 906 and shifts to the gas-liquid two-phase state (Point 3 in FIG. 14). The refrigerant after shifting to the gas-liquid two-phase state in the expansion mechanism 906 undergoes heat exchange by the internal heat exchanger 905 and is thereby cooled down and liquefied (point 4 in FIG. 14). In the internal heat exchanger 905, the heat exchange is performed between the refrigerant after shifting to the gas-liquid two-phase state in the expansion mechanism 906 and the refrigerant after the liquefaction by the internal heat exchanger 905 into liquid-phase refrigerant and decompression by the expansion mechanism 911 into the gas-liquid two-phase state (point 9 in FIG. 14). The liquid-phase refrigerant after undergoing the heat exchange by the internal heat exchanger 905 (point 4 in FIG. 14) branches and flows into the main refrigerant circuit 908 and the injection circuit 912.

The liquid-phase refrigerant flowing in the main refrigerant circuit 908 undergoes heat exchange by the receiver 904 with the refrigerant being taken into the compressor 901 and is thereby cooled down further (point 5 in FIG. 14). The liquid-phase refrigerant cooled down by the receiver 904 is decompressed by the expansion mechanism 903 and shifts to the gas-liquid two-phase state (point 6 in FIG. 14). The refrigerant after shifting to the gas-liquid two-phase state in the expansion mechanism 903 undergoes heat exchange by the heat exchanger 902 as an evaporator and is thereby heated up (point 7 in FIG. 14). At that time, by the absorption of heat by the refrigerant, the water circulating in the water circuit 913 is cooled down and is used for the cooling, refrigeration, freezing or the like. Then, the refrigerant heated up in the heat exchanger 902 is heated further by the receiver 904 (point 8 in FIG. 14) and is taken into the compressor 901.

Meanwhile, the refrigerant flowing in the injection circuit 912 is decompressed by the expansion mechanism 911 (point 9 in FIG. 14) and undergoes heat exchange by the internal heat exchanger 905 (point 10 in FIG. 14) as mentioned above. The refrigerant in the gas-liquid two-phase state (injection refrigerant) after the heat exchange by the internal heat exchanger 905 flows into the compressor 901 through the injection pipe of the compressor 901 while remaining in the gas-liquid two-phase state.

The compression operation in the compressor 901 is the same as that in the heating operation.

Incidentally, when the injection operation is not performed, the degree of opening of the expansion mechanism 911 is set to be fully closed in the same way as in the heating operation so as to prevent the refrigerant from flowing into the injection pipe of the compressor 901.

In the above example, the heat exchanger 902 was described as a heat exchanger like a plate heat exchanger that performs heat exchange between the refrigerant and the water circulating in the water circuit 913. The heat exchanger 902 is not limited to such a heat exchanger but can also be a heat exchanger that performs heat exchange between the refrigerant and air. The water circuit 913 can be a circuit in which a different fluid circulates instead of water.

While the heat exchanger 907 includes the first part 907a and the second part 907b in the above example, it is also possible to configure the heat exchanger 902 to include two parts instead of or in addition to the heat exchanger 907. In cases where the heat exchanger 902 performs heat exchange between the refrigerant and air, the heat exchanger 902 can be configured so that each of the two parts includes a fan and the fans are respectively driven by driving force of separate motors.

While a configuration in which the heat exchanger 902 or 907 includes two parts has been described as above, it is also possible to configure the compressor 901 to include a first part (first compression mechanism) and a second part (second compression mechanism) instead of or in addition to the heat exchanger 902 or 907. In this case, the compressor 901 is controlled so that both of the first part and the second part perform the compression operation when the load on the heat pump device 900 is relatively high and only one of the first part and the second part, e.g., only the first part, performs the compression operation when the load on the heat pump device 900 is relatively low.

In cases of employing such a configuration, the first part and the second part of the compressor 901 are respectively provided with separate motors for driving them. For example, the first motor 41 and the second motor 42 described in the first or second embodiment are respectively used for driving the first part and the second part.

While a configuration in which at least one of the heat exchangers 902 or 907 includes two parts and at least one of the heat exchangers 902 or 907 is provided with two fans has been described as above, it is also possible to configure a heat exchanger to include three or more parts. In a generalized way, at least one of the heat exchangers 902 or 907 can include a plurality of parts and a fan may be provided corresponding to each part. In such cases, driving a plurality of motors with one inverter 4 is possible as described in the first or second embodiment.

Further, while a configuration in which the compressor 901 includes two parts has been described, the compressor 901 may include three or more parts. In a Generalized way, the compressor 901 can include a plurality of parts and a motor may be provided corresponding to each part. In such cases, driving a plurality of motors with one inverter 4 is possible as described in the first or second embodiment.

The heat pump device 900 described in the third embodiment and the motor driving device 50 described in the first embodiment may be combined together.

As described above, by employing the configuration described in the first or second embodiment when there are a plurality motors for driving the compressor 901 in the third embodiment or the fans of the heat exchanger 902 or 907, driving the plurality of motors by using one inverter 4 becomes possible, and cost reduction, miniaturization and weight reduction of the heat pump device 900 and the refrigeration cycle apparatus 800 become possible.

In cases where the motors are those used for driving fans of a heat exchanger, the size of the heat exchanger can be increased thanks to the miniaturization of the motor driving device 50, and accordingly, the heat exchange efficiency increases further and efficiency improvement of the system also becomes possible.

Further, since it becomes possible to adjust the number of motors driven by the inverter 4 by operating the open-close units (9, 9-1-9-4), it is possible, for example, to operate only part of the plurality of motors, e.g., only the first motor 41, when the load is relatively low and operate more motors, e.g., both of the first motor 41 and the second motor 42, when the load is relatively high, and changing the number of driven motors according to the load as above makes it possible to consistently operate only a minimum necessary number of motors, by which the efficiency of the heat pump device can be increased further.

Furthermore, in cases where the control described in the first or second embodiment is employed for the motors for driving the compressor 901, the danger of the step-out is eliminated, which makes it possible not only to continue a stable compression operation but also to inhibit vibration due to the current pulsation, realizing not only noise reduction but also inhibition of breakage of components of the main refrigerant circuit 908 such as piping due to the vibration.

Moreover, in cases where the control described in the first or second embodiment is employed for the motors for driving the fans of the heat exchanger 902 or 907, the danger of the step-out is eliminated, which makes it possible not only to continue a stable heat exchange operation and inhibit vibration due to the current pulsation but also to prevent the occurrence of a difference tone due to speed difference between the fans, and consequently, noise reduction is made possible.

Fourth Embodiment

In a refrigeration cycle apparatus (e.g., the refrigeration cycle apparatus 800 according to the third embodiment) formed of a combination of the motor driving device 50 in the first embodiment and the heat pump device 900 in the third embodiment, the operation mode of the heat pump device 900 is switched corresponding to a change in the load on the refrigeration cycle apparatus, namely, the load on the heat pump device, the part performing the compression operation or the heat exchange operation in the compressor or the heat exchanger is switched according to the operation mode switching, and the number of motors driven is changed correspondingly.

The switching of the part performing the heat exchange operation in the heat exchanger and the switching of the motor(s) for driving the fan(s) for blowing air to parts of the heat exchanger may have a small time difference between each other as will be described below.

For example, let us assume here a configuration in which the heat exchanger includes n parts, n motors are provided corresponding to the n parts, the part performing the heat exchange operation among the n parts is switched according to the load on the refrigeration cycle apparatus, and each of the n motors is driven by the inverter 4 when the corresponding part performs the heat exchange operation.

In this case, the driving of each of the n motors by the inverter may be started after the start of the heat exchange operation of the part of the heat exchanger corresponding to the motor. According to this method, the driving of each motor is started after the appearance of the effect of the heat pump action of the heat pump device, by which the power consumption by the motors can be reduced.

Conversely, it is also possible to start the driving of each of the n motors by the inverter before the start of the heat exchange operation of the part of the heat exchanger corresponding to the motor. According to this method, the driving of a motor has already been started when the effect of the heat pump action of the heat pump device appears, which enables effective use of the result of the heat pump action.

Further, the driving of each of the n motors by the inverter may be stopped after the stoppage of the heat exchange operation of the part of the heat exchanger corresponding to the motor. According to this method, effective use of the effect of the heat pump action becomes possible.

Conversely, it is also possible to stop the driving of each of the n motors by the inverter before the stoppage of the heat exchange operation of the part of the heat exchanger corresponding to the motor. According to this method, the power consumption by the motors can be reduced.

Incidentally, the configurations shown in the above embodiments are just examples or the configuration of the present invention; it is also possible to combine the above-described configurations with another publicly known technology or to modify the configurations, like omitting a part, within a range not departing from the subject matter of the present invention.

What is claimed is:

1. An outdoor unit for a refrigeration cycle apparatus, comprising:
    at least one heat exchanger;
    a first motor including a first rotor and a first fan, the first fan rotating together with the first rotor;
    a second motor including a second rotor and a second fan, the second fan rotating together with the second rotor;
    a first lead wire electrically connected to the first motor;
    a second lead wire electrically connected to the second motor;
    an inverter that applies voltage to the first motor and the second motor through the first lead wire and the second lead wire respectively;
    a connection switching unit that is electrically connected to the second lead wire and switches the voltage applied to the second motor between on and off, the connection switching unit being formed of a wide band gap semiconductor or an electromagnetic contactor; and
    a controller that controls the inverter and the connection switching unit; and
    a housing covering the first motor, the at least one heat exchanger, the inverter, the connection switching unit, and the controller and including an intake port and a discharge port, the intake port being vertically lower than the discharge port when the outdoor unit is in an installed state,
    wherein a path through which an air current generated by the first fan passes extends from a vertically lower side to a vertically upper side in the outdoor unit,
    the path extending from the vertically lower side to the vertically upper side in the outdoor unit passes over the inverter and the at least one heat exchanger,
    the air current that has passed over the inverter passes over the at least one heat exchanger, and
    the inverter is disposed closer to the first motor than to the second motor.

2. The outdoor unit according to claim 1, wherein the controller is disposed closer to the first motor than to the second motor.

3. The outdoor unit according to claim 1, further comprising a core that reduces noise current passing through the second lead wire, wherein
    the first lead wire is shorter than the second lead wire, and
    the core is attached to the second lead wire.

4. The outdoor unit according to claim 1, further comprising a core that reduces noise current passing through the first lead wire and noise current passing through the second lead wire, wherein
    length of the first lead wire is equal to length of the second lead wire,
    current flowing through the first lead wire is in sync with current flowing through the second lead wire, and
    the core is attached to the first lead wire and the second lead wire so that the current flowing through the first lead wire and the current flowing through the second lead wire are in directions opposite to each other in the core.

5. The outdoor unit according to claim 1, wherein the inverter is formed of at least one of a semiconductor switching element or a freewheeling diode.

6. The outdoor unit according to claim 5, wherein the semiconductor switching element is formed of a wide band gap semiconductor.

7. The outdoor unit according to claim 5, wherein the freewheeling diode is formed of a wide band gap semiconductor.

8. The outdoor unit according to claim 1, wherein the first motor includes a permanent magnet.

9. The outdoor unit according to claim 1, wherein the second motor includes a permanent magnet.

10. A refrigeration cycle apparatus comprising the outdoor unit according to claim 1.

11. The outdoor unit according to claim 1, wherein the inverter is disposed under the first motor and the at least one heat exchanger.

12. The outdoor unit according to claim 1, wherein the controller is disposed under the first motor and the at least one heat exchanger.

13. The outdoor unit according to claim 1, wherein the path passes over the controller.

* * * * *